United States Patent
Henderson et al.

(10) Patent No.: US 11,108,591 B2
(45) Date of Patent: Aug. 31, 2021

(54) TRANSPORTING FIBRE CHANNEL OVER ETHERNET

(71) Applicants: Alex E. Henderson, San Carlos, CA (US); Walter E. Croft, San Mateo, CA (US); John W Hayes, Reno, NV (US); Linda Elaine Eaton Hayes, Reno, NV (US)

(72) Inventors: Alex E. Henderson, San Carlos, CA (US); Walter E. Croft, San Mateo, CA (US); John W Hayes, Reno, NV (US); Linda Elaine Eaton Hayes, Reno, NV (US)

(73) Assignee: John W. Hayes, Clearwater, FL (US)

( * ) Notice: Subject to any disclaimer, the term of this patent is extended or adjusted under 35 U.S.C. 154(b) by 0 days.

(21) Appl. No.: 13/999,756

(22) Filed: Mar. 18, 2014

(65) Prior Publication Data
US 2016/0226756 A1    Aug. 4, 2016

Related U.S. Application Data

(63) Continuation-in-part of application No. 13/385,390, filed on Feb. 15, 2012, now abandoned, which is a continuation-in-part of application No. 12/590,929, filed on Feb. 17, 2009, now abandoned, which is a continuation-in-part of application No. 11/890,288, filed on Aug. 3, 2007, now abandoned, which is a continuation-in-part of application No. 10/689,540, filed on Oct. 21, 2003, now abandoned.

(51) Int. Cl.
*H04L 12/721* (2013.01)
*H04L 12/46* (2006.01)

(52) U.S. Cl.
CPC ................. *H04L 12/4633* (2013.01)

(58) Field of Classification Search
CPC . H04L 49/357; H04L 49/351; H04L 61/6022; H04L 61/6045
USPC ................. 370/389, 392, 401, 466
See application file for complete search history.

(56) References Cited

U.S. PATENT DOCUMENTS

| | | | |
|---|---|---|---|
| 6,400,730 B1 * | 6/2002 | Latif | H04L 12/06 370/466 |
| 6,668,290 B1 * | 12/2003 | Nelson | H04L 49/9042 370/470 |
| 6,728,803 B1 * | 4/2004 | Nelson | G06F 13/4022 370/398 |
| 6,738,821 B1 * | 5/2004 | Wilson | H04L 12/413 709/220 |
| 6,920,154 B1 | 7/2005 | Achler | 370/477 |

(Continued)

*Primary Examiner* — Mark H Rinehart
*Assistant Examiner* — Kenneth P Hunt
(74) *Attorney, Agent, or Firm* — Thomas Nello Giaccherini

(57) ABSTRACT

Methods and apparatus for the Transporting of Fibre Channel data over Ethernet are disclosed. In one embodiment of the invention, Fibre Channel data frame and primitive signals are transported over Ethernet instead of using the Fibre Channel FC-1 and FC-0 protocols. This allows less expensive Ethernet equipment and devices to transport and perform services for Fibre Channel connected devices without having a physical Fibre Channel interface. The ability to provide Fibre Channel services and functions without having a physical Fibre Channel interface allows existing Ethernet equipment to be placed into service as SAN components without modification.

8 Claims, 23 Drawing Sheets

(56) References Cited

U.S. PATENT DOCUMENTS

| | | | |
|---|---|---|---|
| 7,020,715 B2 | 3/2006 | Venkataraman et al. | 709/236 |
| 7,307,995 B1 | 12/2007 | Iyer et al. | 370/395.32 |
| 7,308,001 B2 | 12/2007 | Collette et al. | 370/471 |
| 7,346,058 B1 | 3/2008 | Natarajan et al. | 370/392 |
| 8,953,608 B1 * | 2/2015 | Borker | H04L 67/1097 370/392 |
| 2002/0133620 A1 * | 9/2002 | Krause | G06F 9/544 709/238 |
| 2003/0084219 A1 * | 5/2003 | Yao | H04L 29/06 710/300 |
| 2003/0120915 A1 * | 6/2003 | Kleinsteiber | H04L 49/10 713/153 |
| 2003/0140209 A1 * | 7/2003 | Testardi | G06F 3/0601 711/203 |
| 2004/0028043 A1 * | 2/2004 | Maveli | H04L 29/06 370/392 |
| 2004/0103220 A1 * | 5/2004 | Bostick | H04L 12/24 709/253 |
| 2005/0027841 A1 * | 2/2005 | Rolfe | H04L 41/0226 709/223 |
| 2008/0056300 A1 * | 3/2008 | Williams | H04L 12/4633 370/466 |
| 2010/0150174 A1 * | 6/2010 | Bhide | H04B 10/25 370/474 |
| 2012/0063316 A1 * | 3/2012 | Ghanwani | H04L 47/10 370/235 |
| 2012/0177039 A1 * | 7/2012 | Berman | H04L 41/12 370/390 |
| 2013/0246650 A1 * | 9/2013 | Tsuboki | H04L 49/10 709/236 |

\* cited by examiner

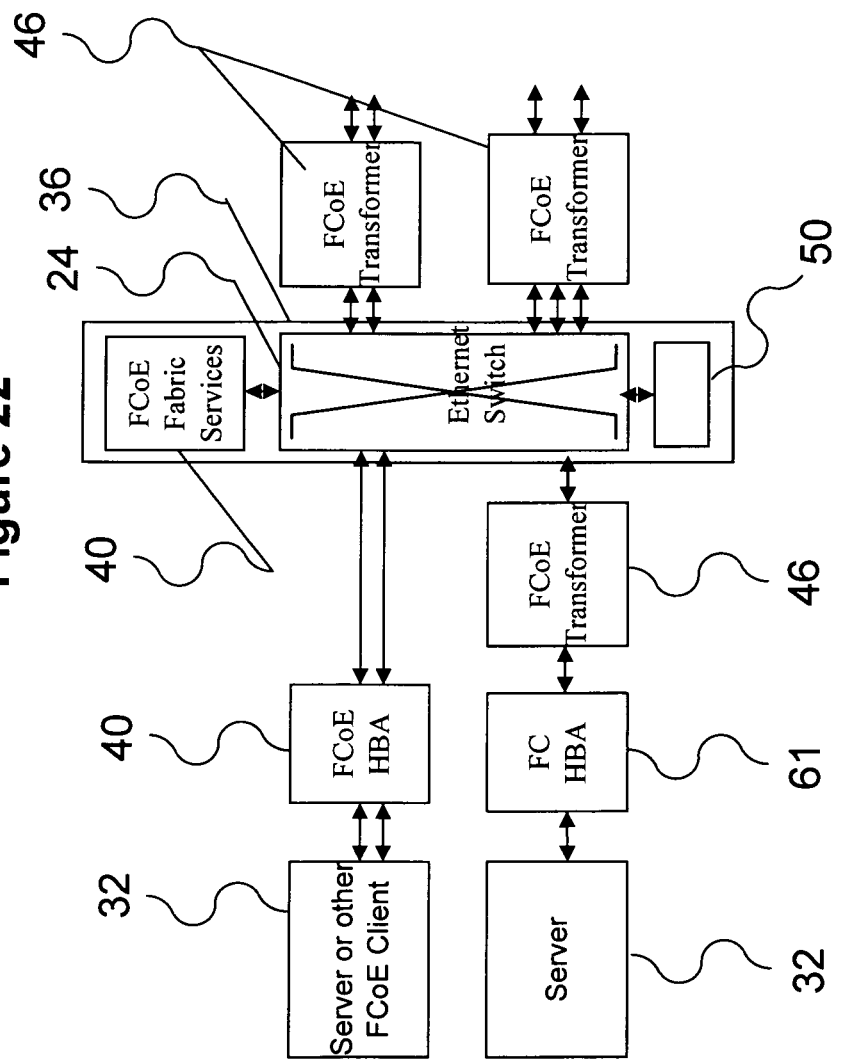

TRANSPORTING FIBRE CHANNEL OVER ETHERNET

CROSS-REFERENCE TO RELATED PENDING PATENT APPLICATIONS & CLAIMS FOR PRIORITY

This application is a continuation in part of and claims priority to U.S. application Ser. No. 13/385,390, filed 15 Feb. 2012, the disclosure of which is incorporated by reference herein in its entirety. U.S. application Ser. No. 13/385,390 in turn, is a continuation in part of and claims priority to U.S. application Ser. No. 12/590,929, filed 17 Feb. 2009, the disclosure of which is incorporated by reference herein in its entirety. U.S. application Ser. No. 12/590,929 in turn, is a continuation in part of and claims priority to U.S. application Ser. No. 11/890,288, filed 3 Aug. 2007, the disclosure of which is incorporated by reference herein in its entirety. U.S. application Ser. No. 11/890,288 in turn, is a continuation in part of and claims priority to U.S. application Ser. No. 10/689,540, filed 21 Oct. 2003, the disclosure of which is incorporated by reference herein in its entirety. Priority is also claimed to U.S. application Ser. No. 10/689,540, filed 21 Oct. 2003.

FEDERALLY SPONSORED RESEARCH OR DEVELOPMENT

None.

FIELD OF THE INVENTION

The present invention pertains to methods and apparatus for transporting Fibre Channel data frames and primitive signals over Ethernet. Most Storage Area Networks (SANs) have been built using a technology called Fibre Channel. Most Local Area Networks (LANs) have been built using a technology called Ethernet. When both a LAN and a SAN are required, two separate networks of differing technologies are used. In one preferred embodiment of this invention, enables the transport of Fibre Channel data frames and primitive signals. In another preferred embodiment, the invention enables the replacement of the Fibre Channel FC-2 protocol by the Fibre Channel over Ethernet (FCoE) protocol.

BACKGROUND OF THE INVENTION

The current state of the art in computer data center networking technology is based upon two different types of networks; Local Area Networks (LANs) and Storage Area Networks (SANs).

The LAN is a general-purpose network for server-to-server and server-to-Internet communication, typically carrying TCP/IP traffic over high-speed Ethernet (Fast Ethernet or Gigabit Ethernet). Ethernet, in its various forms, is the dominant LAN technology in use today. The Ethernet standards are governed by the IEEE (Institute Electrical and Electronics Engineers) LMSC (LAN/MAN Standards Committee) 802. The various standards that comprise Ethernet have evolved over time to describe a robust and flexible set of Physical (layer 1) and MAC (layer 2) protocols. Collectively taken together as Ethernet, this LAN networking technology has demonstrated exceptional interoperability between multiple equipment vendors and great adoption by the computing industry resulting in market adoption approaching 90%. This market dominance has enabled Ethernet component vendors to produce products on a very large scale and to reduce costs and pricing over time. In addition to being the dominant LAN networking technology, Ethernet is also the most cost effective LAN technology.

The SAN is a special-purpose network for server-to-storage communication, typically implemented using Fibre Channel technology because of its high-performance characteristics. Fibre Channel, in its various forms, is the dominant SAN technology in use today. The Fibre Channel standards are governed by the INCITS (InterNational Committee for Information Technology Standards) Technical Committee 11. The various standards that comprise Fibre Channel have evolved over time to describe a set of layer 1 through layer 4 protocols. Collectively taken together as Fibre Channel, this SAN networking technology has been adopted by disk drive manufacturers as the primary SAN interface for their products. Despite the standardization efforts, Fibre Channel has been plagued with interoperability issues. Although Fibre Channel is the dominant SAN technology, the interoperability issues and a smaller market for SANs has kept costs and prices for Fibre Channel equipment high, much higher than comparable speed Ethernet equipment.

Servers, which are connected to both networks, use the SAN to access remote storage and the LAN for all other communication. This two network architecture offers considerable benefits, derived chiefly from the dissaciation of storage from the physical server. If applications store state information in remote storage, then a spare server can replace a failed server simply by connecting to the SAN. Similarly, applications can access spare processing capacity if idle servers are added, and the remote storage is used to coordinate the work of the new servers. This improved availability and manageability makes scaling out the data center possible, and scalability is necessary to support growing client demands. Although the LAN/SAN architecture provides increased flexibility and functionality, this approach also has drawbacks. The fact that it consists of two networks—and is thus a disjointed communication infrastructure—implies considerable support overhead. Because the LAN and SAN differ in their basic technologies and usage, most data centers have necessarily evolved two separate technical cultures for their respective support. This schism also manifests in the software abstractions required to manage the data center. Separate administrative consoles exist for server and application functions and for storage services. Although the LAN/SAN segregation does not cause this fragmentation of management interfaces, it does not mitigate the fragmentation either. Finally, maturity of SAN standards significantly lags behind that of the more general-purpose LAN, diminishing return on investment (ROI). The LAN/SAN design is state of the art and a vast improvement over previous architectures, but it is an intermediate step in data center evolution.

A unified LAN/SAN is the next step—it will enable SAN devices to be accessed using LAN technology. The emergence of new interconnect technologies will provide a single, standards-based infrastructure for both general-purpose and high performance networking requirements. Recent attempts at providing SAN connectivity over LAN have primarily involved running various storage protocols over TCP/IP. These protocols are commonly known as IP storage. The three most notable efforts have been iSCSI, FCiP and iFCP. These protocols provide block access, tunneling and device access respectively. At the SAN device endpoint, a gateway is necessary to provide a TCP connection and perform the physical connectivity to the SAN device's native electrical interface. Because of these issues, building IP storage gateways are inherently expensive.

The technology called Fibre Channel is governed by the Technical Committee T11, within the InterNational Committee for Information Technology Standards (INCITS). The T11 Committee was previously known as X3T9.3 Committee. The T11 Committee has produced a number of specifications defining the various aspects of the Fibre Channel technology. One of these specifications is the, dated Jun. 1, 1994. *Fibre Channel Physical and Signalling Interface* (FC-PH) Rev 4.3 *Specification*.

The *Fibre Channel Physical and Signaling Interface Specification* (FC-PH) Rev 4.3 dated Jun. 1, 1994 states:
"3.1.132. Primitive Sequence: An ordered set transmitted repeatedly and continuously until a specified response is received (see 16.4 and 24.8.1).
3.1.133. Primitive Signal: An ordered set designated to have a special meaning such as an Idle or Receiver Ready (R_RDY) (see 16.3)." FC-PH, Page 9, Col 1, Lines 41-48.

The *Fibre Channel Physical and Signaling Interface Specification* (FC-PH) Rev 4.3 dated Jun. 1, 1994 further states:
"3.1.154. Sequence: A set of one or more Data frames with a common Sequence_ID (SEQ_ID), transmitted unidirectionally from one N_Port to another N_Port with a corresponding response, if applicable, transmitted in response to each Data frame (see clause 24)." FC-PH, Page 10, Col 2, Lines 4-9.

The present invention, unlike the invention presented in U.S. Pat. No. 6,400,730 by Latif et al. (Latif), does not require the use of IP packets to encapsulate the Fibre Channel data. The present invention transports Fibre Channel data frames, Fibre Channel primitive signals and Fibre Channel primitive sequences at over Ethernet at the MAC layer without using higher layer networking protocols such as IP and UDP.

The present invention, unlike the invention presented in Latif, enables the use of multiple Fibre Channel interfaces and multiple Ethernet interfaces to be associated and supported by a single FCoE Transformer. Multiple Fibre Channel interfaces are enabled by the use of the Interface Port Identifierfield in the FCoE Header. Multiple Ethernet interfaces are enabled by the use of the Interface Identifier field in the FCoE Header. The encapsulation of Fibre Channel frame data directly within an Ethernet frame as described in Latif enables only a single Ethernet port and a single Fibre Channel port, greatly limiting its applicability and use.

The present invention, unlike the invention presented in U.S. Pat. No. 7,307,995 by Iyer et al. (Iyer) does not require intermediate network devices, such as Ethernet switches, to be aware of individual Fibre Channel data stream specific information. In an FCoE environment, all FCoE traffic is processed as Ethernet traffic. Within an FCoE Transformer, the information used to select a specific Ethernet port and a specific Fibre Channel port is contained within the FCoE Header and the FCoE Type Header. Compared with Iyer, which requires that Fibre Channel data stream specific information, specifically the Exchange_ID, which is located within the FCP header, to be interrogated by the system in order to operate. The present invention does not require these complex steps to accomplish its goal.

All of the above IP storage solutions incorporate mechanisms that require a TCP offload engine and associated support logic and buffering and are expensive to implement. A system that can easily, efficiently and reliably carry Fibre Channel data frames and primitive signals over Ethernet at the MAC layer (layer 2) would constitute a major technological advance, and would satisfy long felt needs and aspirations in the LAN, SAN and server industries.

SUMMARY OF THE INVENTION

The present invention provides methods and apparatus for transporting Fibre Channel data over Ethernet. Fibre Channel data comprises Fibre Channel data frames, primitive signals and primitive sequences. Transporting Fibre Channel data over Ethernet enables existing Ethernet equipment including layer 2, 3, 4 and 7 Ethernet switches and Ethernet network interface cards (NICs) to connect to, communicate with and provide services for SANs that are based on Fibre Channel technology or have Fibre Channel interfaces. All of the above can be accomplished by using an apparatus that transforms Fibre Channel data into Ethernet frames and visa-versa. This apparatus is called a Fibre Channel over Ethernet Transformer (FCoE Transformer). Additional SAN switching functions such as device virtualization can be provided by an FCoE Fabric. An FCoE Fabric is an Ethernet switch that provides FCoE Fabric services.

An FCoE Transformer is the interface between the Ethernet and the Fibre Channel SAN network. The FCoE Transformer is responsible for converting the FCoE protocol to the Fibre Channel FC-1 protocol and vise-versa. Each FCoE Transformer has at least two ports; an Ethernet Port and a Fibre Channel port. An FCoE capable NIC or embedded MAC (an FCoE port) in a server can communicate with multiple FCoE Transformers. These communications are referred to as an association between an FCoE port and a Transformer. The FCoE port in a server is referred to as an FCoE Host Bus Adapter (HBA). When initializing and associating with one or more FCoE ports, the FCoE Transformer performs link and loop initialization and participates in physical address assignment under the direction of an Ethernet port. Once initialized and associated, the FCoE Transformer translates FC-1 data frames, primitive signals and primitive sequences to and from FCoE frames. An FCoE Transformer may be used between any Fibre Channel HBA, fabric or device and any FCoE HBA or Fabric. Specifically, an FCoE Transformer can be used between an FC HBA and an FCoE Fabric or it may be used between an FCoE Fabric and a Fibre Channel device. Two FCoE Transformers may be used back to back on the Ethernet interface without an intervening FCoE fabric.

Transporting Fibre Channel data over Ethernet is enabled by a number of cooperating methods; a method to transport Fibre Channel data frames over Ethernet, a method to transport Fibre Channel primitive sequences over Ethernet, a method to locate an FCoE Transformer or an FCoE Fabric, a method to associate an FCoE port with an FCoE Transformer or Fabric, and a method to manage an FCoE Transformer, among others.

Once Fibre Channel data is being transported over Ethernet, a number of new features and devices are enabled. One preferred embodiment of this is performing Fibre Channel encryption using Ethernet devices. Another preferred embodiment is performing storage management using Ethernet devices.

Methods of constructing the FCoE Transformer include using independent Ethernet and Fibre Channel interfaces connected by a network processor, by using a Field Programmable Gate Array (FPGA), by using a special purpose ASIC, by software running on a Ethernet or Fibre Channel connected device, by hardware state machines, or by a combination of hardware and software. The FCoE Transformer can be placed on an Ethernet NIC, in an Ethernet MAC, in an Ethernet switch, in a Fibre Channel switch, in a Fibre Channel HBA, or anyplace in between a Fibre Channel device and an Ethernet device. An appreciation of the other aims and objectives of the present invention and a more complete and comprehensive understanding of this invention may be obtained by studying the following description of a preferred embodiment, and by referring to the accompanying drawings.

A BRIEF DESCRIPTION OF THE DRAWINGS

FIG. 22 is an illustration which shows a how the FCoE components can be connected together.

A DETAILED DESCRIPTION OF PREFERRED & ALTERNATIVE EMBODIMENTS

I. Overview of the Invention

The present invention provides methods and apparatus for transporting Fibre Channel data over Ethernet. Fibre Channel data frames, primitive signals and primitive sequences are collectively called Fibre Channel data. The protocol that describes the transformation of Fibre Channel data into Ethernet frames and visa-versa is called the Fibre Channel over Ethernet (FCoE) protocol. The apparatus that transforms Fibre Channel data into Ethernet frames and visa-versa is called a Fibre Channel over Ethernet Transformer.

In one preferred embodiment, the task of encrypting a Fibre Channel payload is performed using an Ethernet device. In another preferred embodiment, the task of performing storage management of a Fibre Channel payload is performed using an Ethernet device.

In other preferred embodiments, other tasks and sequences of tasks may be performed on Fibre Channel data using Ethernet based devices. The tasks and sequences of tasks are described in further detail below.

Figure 1:
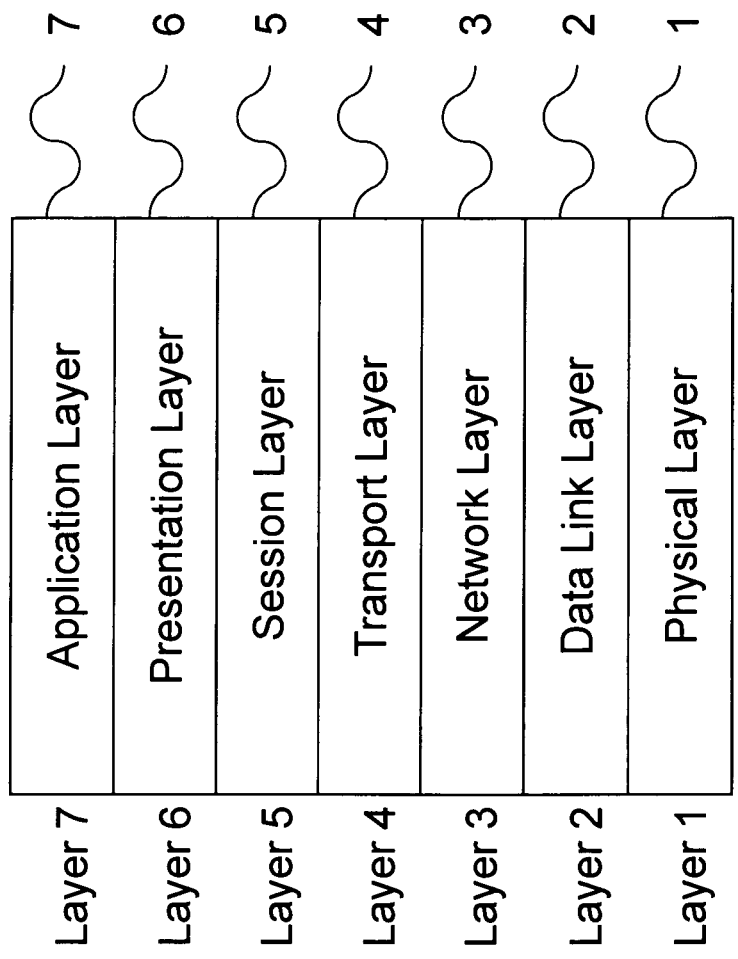
FIG. 1 is an illustration of the classical ISO protocol layering stack.

FIG. 1 generally illustrates the classic ISO protocol layering stack. The Physical layer 1 communicates with the Data Link layer 2. The Data Link layer 2 communicates with the Network layer 3. The Network layer 3 communicates with the Transport layer 4. The Transport layer 4 communicates with the Session layer 5. The Session layer 5 communicates with the Presentation layer 6. The Presentation layer 6 communicates with the Application layer 7. When a given layer is not present, the lower layer communicates with the next higher layer. For example, if the Session layer 5 and the Presentation layer 6 are not present, the Transport layer 4 communicates directly with the Application layer 7.

Figure 2:
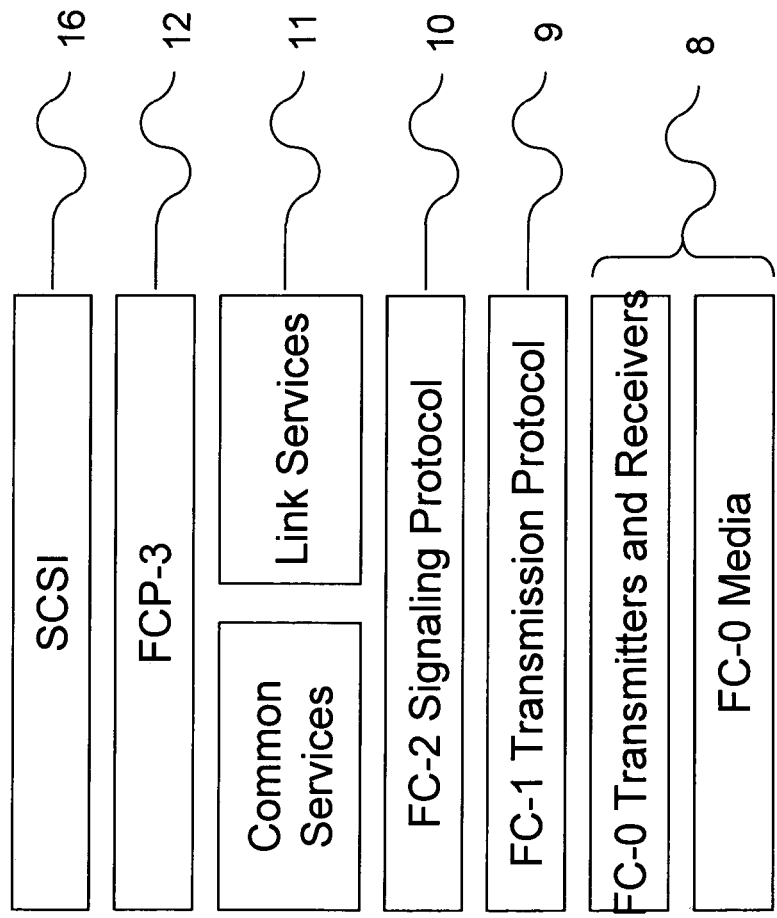
FIG. 2 is an illustration of the Fibre Channel protocol architecture

FIG. 2 generally illustrates the Fibre Channel protocol stack. The Fibre Channel Media layer and the Fibre Channel Transmitters and Receivers layer form the Fibre Channel Physical layer 8. The Fibre Channel Physical layer 8 communicates with the Fibre Channel Transmission Protocol 9. The Fibre Channel Transmission Protocol 9 communicates with the Fibre Channel Signaling Protocol 10. The Fibre Channel Common Services and the Fibre Channel Link Services are taken together to form the Fibre Channel layer 3 protocol 11. The Fibre Channel Signaling protocol 10 communicates with the Fibre Channel layer 3 protocol 11. The Fibre Channel layer 3 protocol 11 communicates with the Fibre Channel Upper Layer Protocol Mapping Protocol 12. The Fibre Channel Upper Layer Protocol Mapping Protocol 12 communicates with the Upper Layer Protocol 16.

Figure 3:
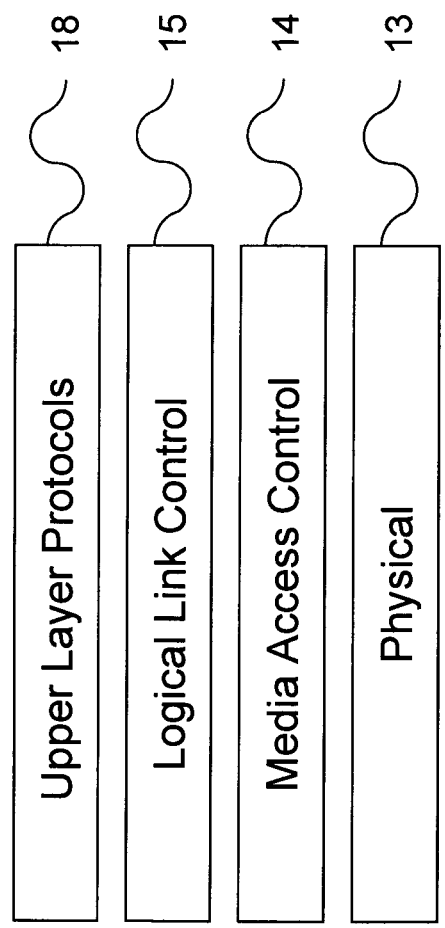
FIG. 3 is an illustration of the Ethernet protocol architecture

FIG. 3 generally illustrates the Ethernet protocol stack. The Ethernet Physical layer 13 communicates with the Ethernet Media Access Control 14 layer. The Ethernet Media Access Control layer 14 communicates with the Ethernet Logical Link Control layer 15. The Ethernet Logical Link Control layer 15 communicates with the Upper Layer Protocols.

Figure 4:
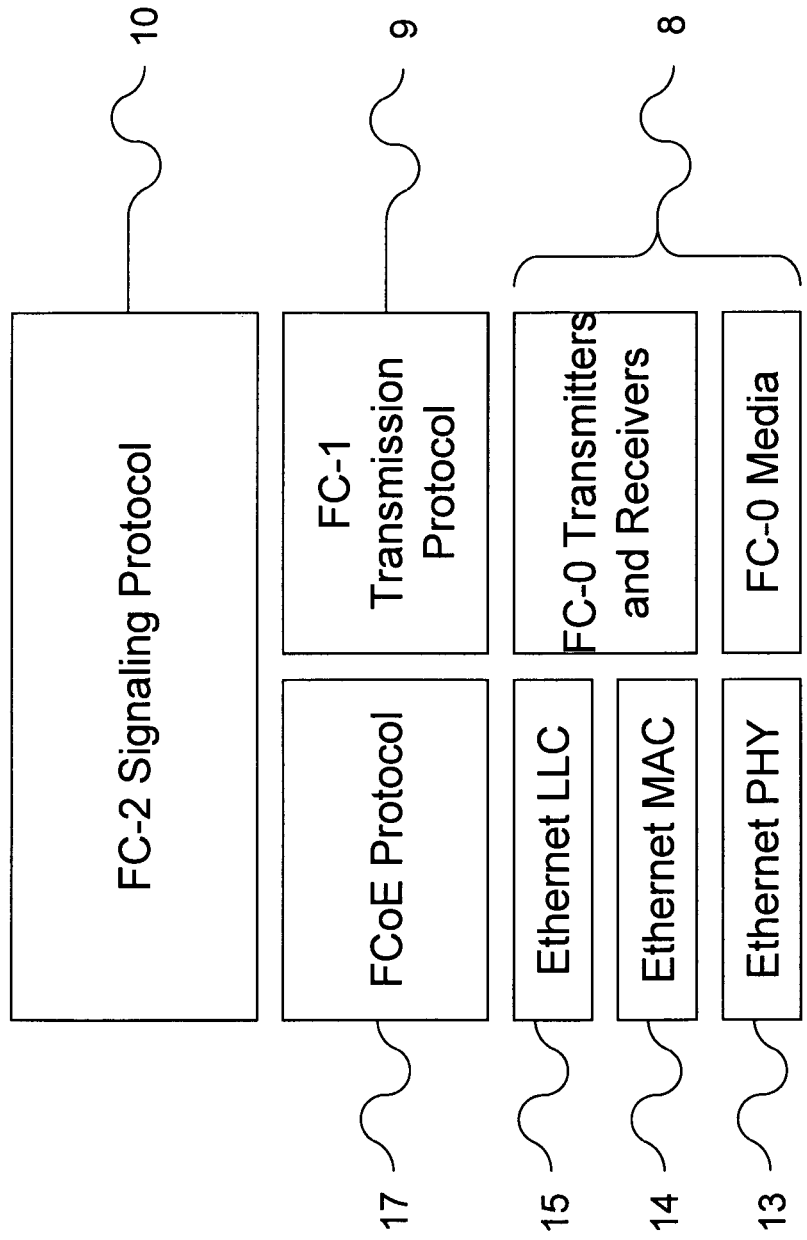
FIG. 4 is an illustration of the FCoE protocol architecture.

FIG. 4 generally illustrates the FCoE protocol stack. The Ethernet Physical layer 13 communicates with the Ethernet Media Access Control layer 14. The Ethernet Media Access Control layer 14 communicates with the Ethernet Logical Link Control layer 15. The Ethernet Logical Link Control layer 15 communicates with the FCoE protocol 17. The FCoE protocol 17 communicates with the Fibre Channel Signaling protocol 10. The Fibre Channel Signaling protocol 10 communicates with both the FCoE protocol 17 and the Fibre Channel Transmission protocol 9.

Figure 5:
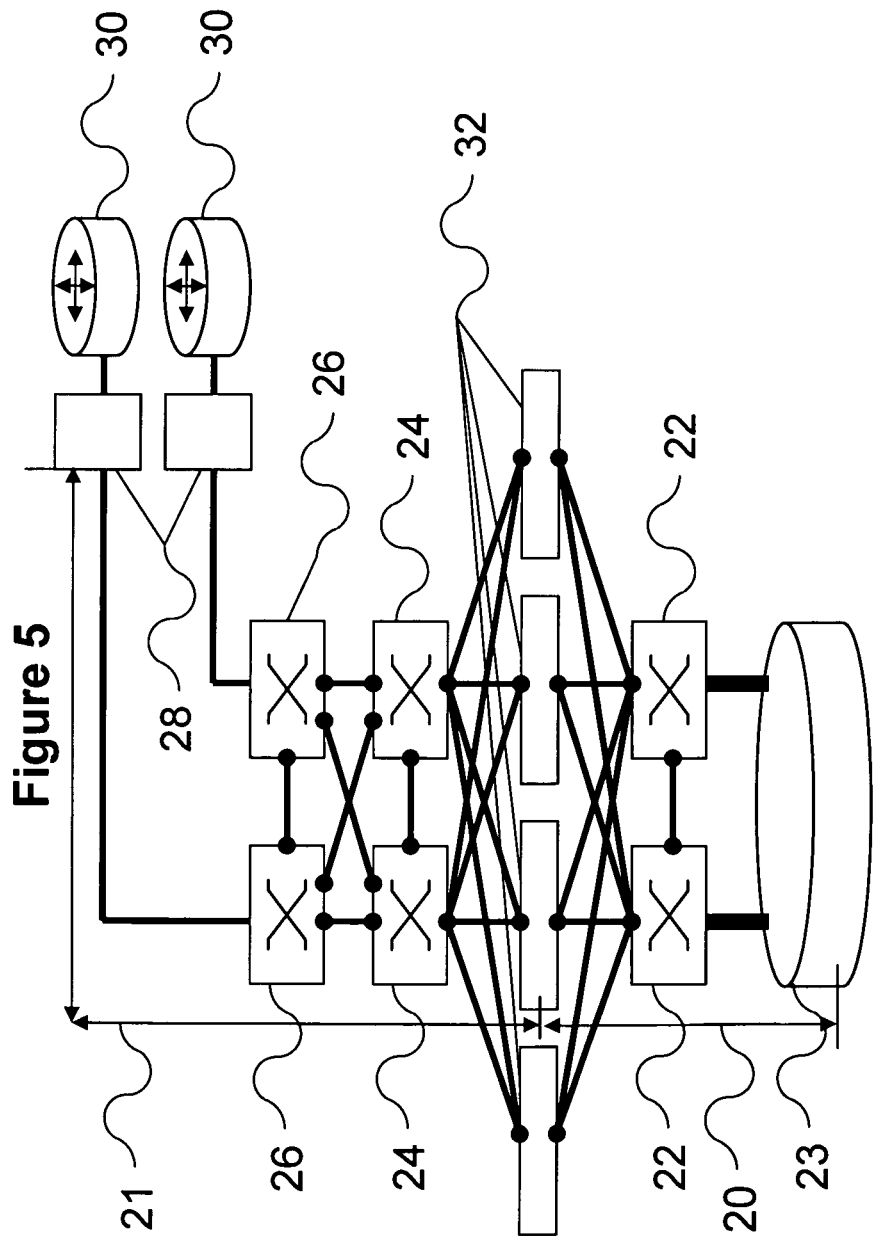
FIG. 5 is an illustration which shows a data center with both a LAN and a SAN.

FIG. 5 is a schematic depiction of the embodiments of a computer network to which the present invention pertains as Transporting Fibre Channel over Ethernet from the servers 32. Routers 30 are attached to an external network. Routers 30 are also attached to firewalls 28. The firewalls 28 are connected to layer 4-7 switches 26.

The layer 4-7 switches 26 are connected to the layer 2 switches 24. The layer 2 switches 24 are connected to the servers 32. The servers 32 are connected to a Fibre Channel switch 22. The Fibre Channel switch 22 is connected to the Storage network 20.

Figure 6:
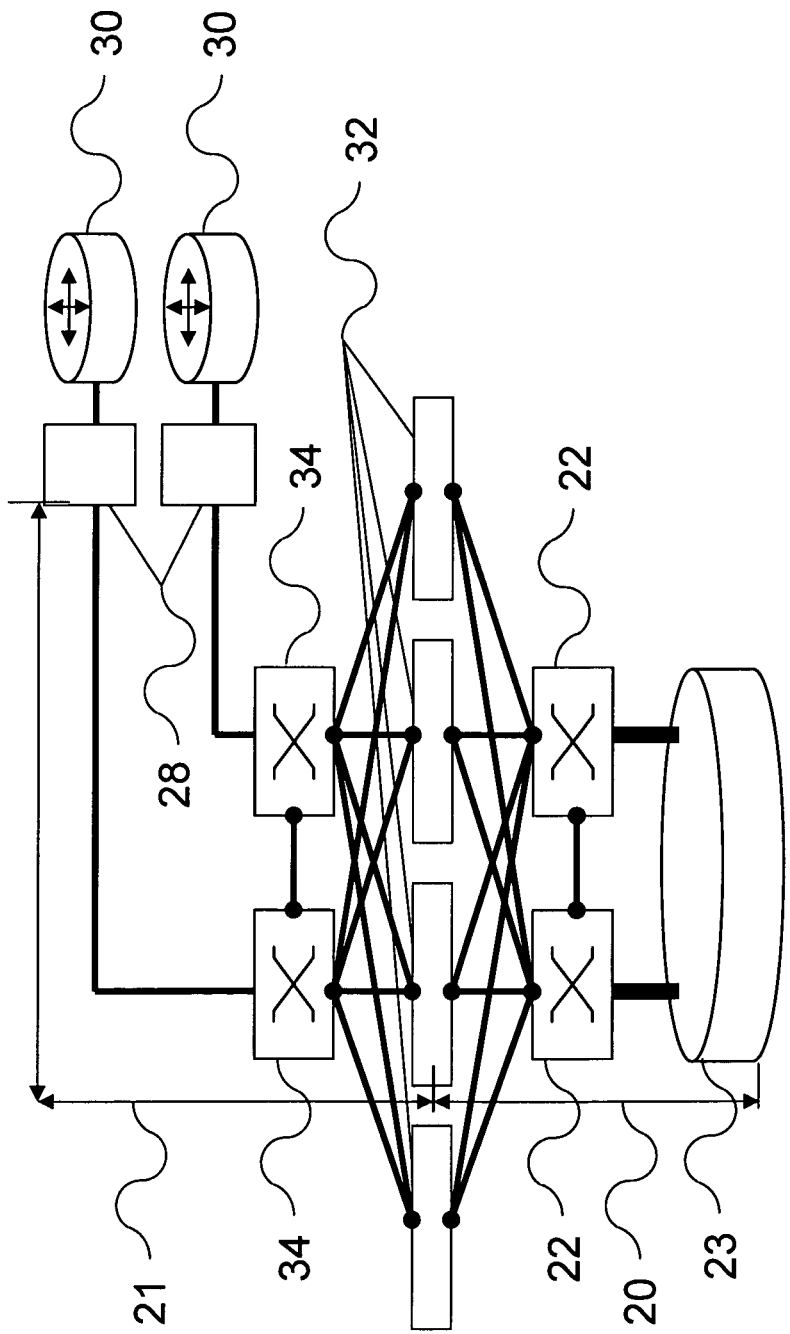
FIG. 6 is an illustration which shows a data center with a merged L2-7 Ethernet topology

FIG. 6 is a schematic depiction of the embodiments of a computer network to which the present invention pertains as Transporting Fibre Channel over Ethernet from the servers 32. Routers 30 are attached to an external network. Routers 30 are also attached to firewalls 28. The firewalls 28 are connected to layer 2-7 switches 34. The layer 2-7 switches 34 are connected to the servers 32. The servers 32 are connected to a Fibre Channel switch 22. The Fibre Channel switch 22 is connected to the Storage network 20.

Figure 7:
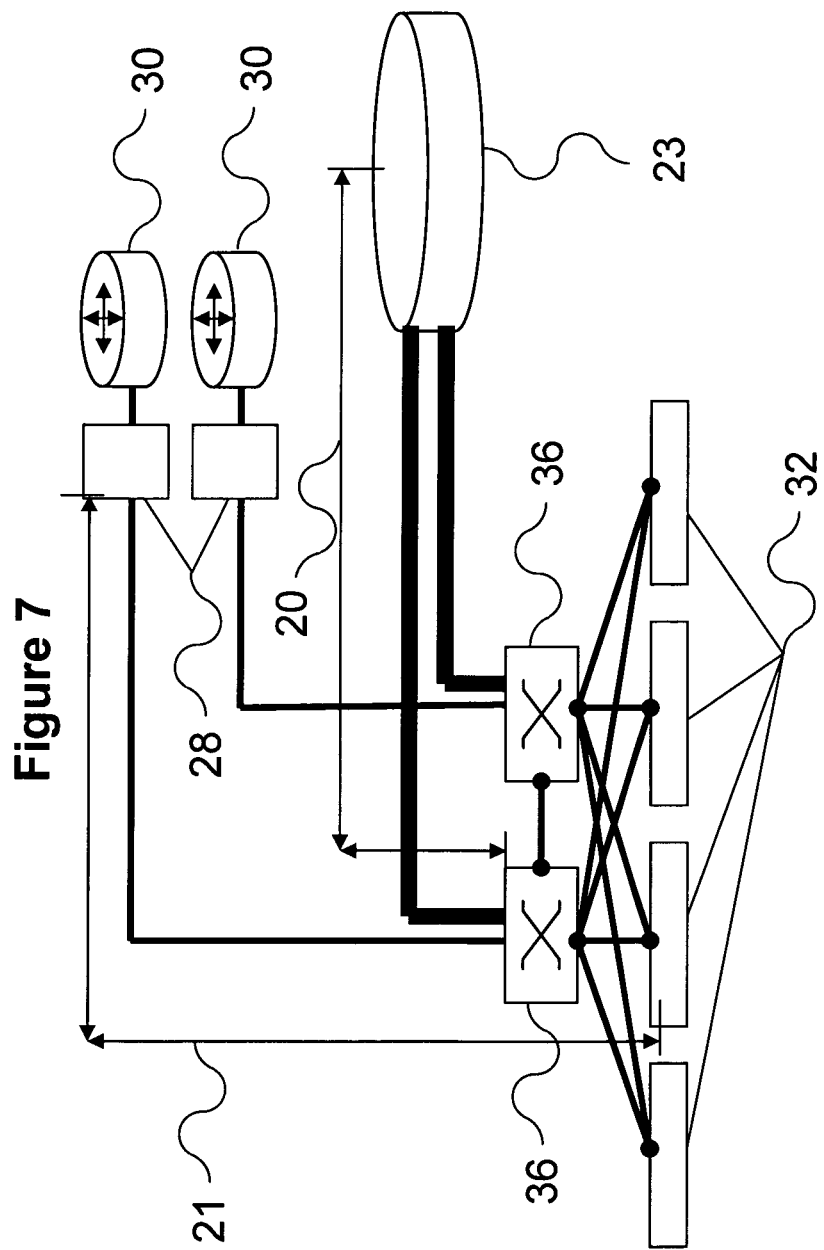
FIG. 7 is an illustration which shows a data center with a merged LAN/SAN data center topology

FIG. 7 is a schematic depiction of the embodiments of a computer network to which the present invention pertains as Transporting Fibre Channel over Ethernet from the servers 32. Routers 30 are attached to an external network. Routers 30 are also attached to firewalls 28. The firewalls 28 are connected to LAN/SAN switches 36. The LAN/SAN switches 36 are connected to the servers 32. The LAN/SAN switches 36 are also connected to the Storage network 20.

Figure 8:
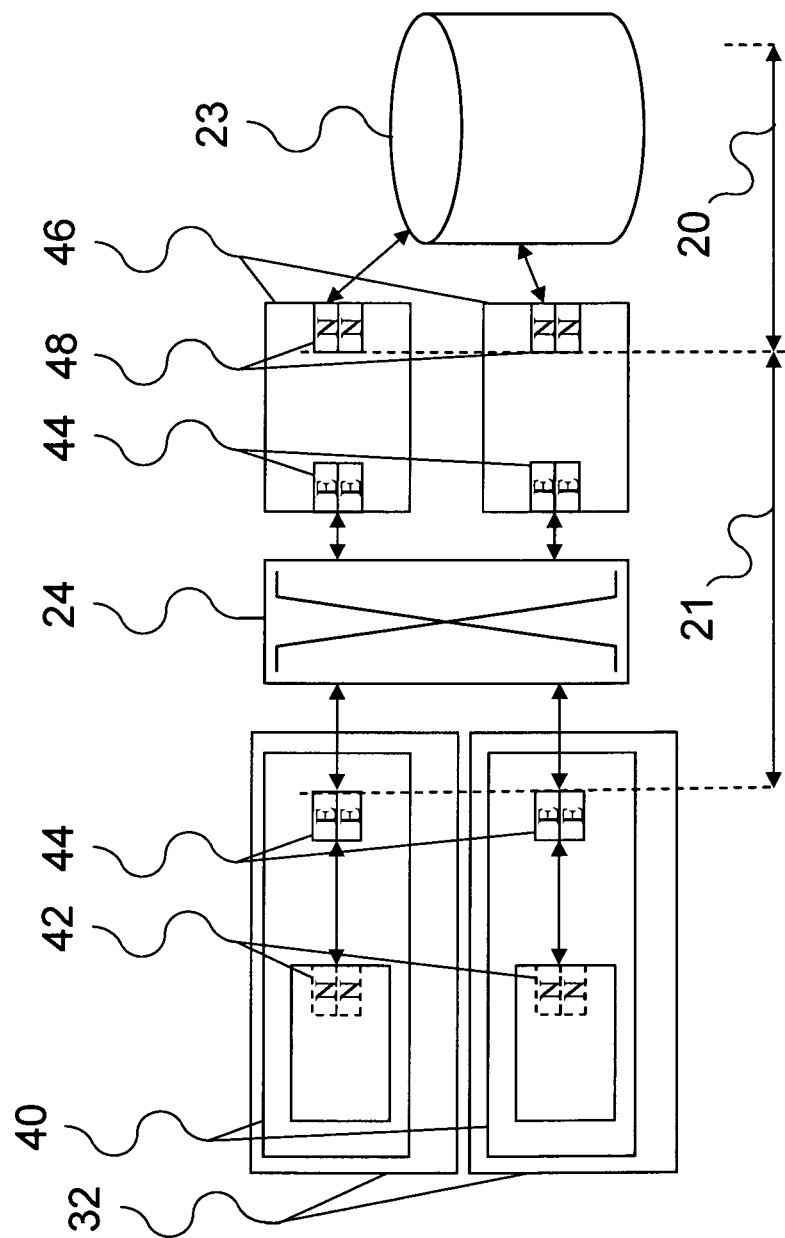
FIG. 8 is an illustration which shows a network topology containing an FCoE HBA, an FCoE Transformer and a Fibre Channel SAN.

FIG. 8 is a schematic depiction of an embodiment of the invention. A server 32 contains a FCoE Host Bus Adapter (HBA) 40. The FCoE HBA 40 contains a number of virtual Fibre Channel N-Ports 42 and an Ethernet interface 44. The FCoE HBA 40 is connected to an Ethernet layer 2 switch 24. The Ethernet layer 2 switch 24 is also connected to an FCoE Transformer 46. The FCoE Transformer 46 is connected to the Fibre Channel SAN 20. Contained within the FCoE Transformer 46 are a number of real Fibre Channel N-Ports 48 that correspond to the virtual Fibre Channel N-Ports 42.

Figure 9:
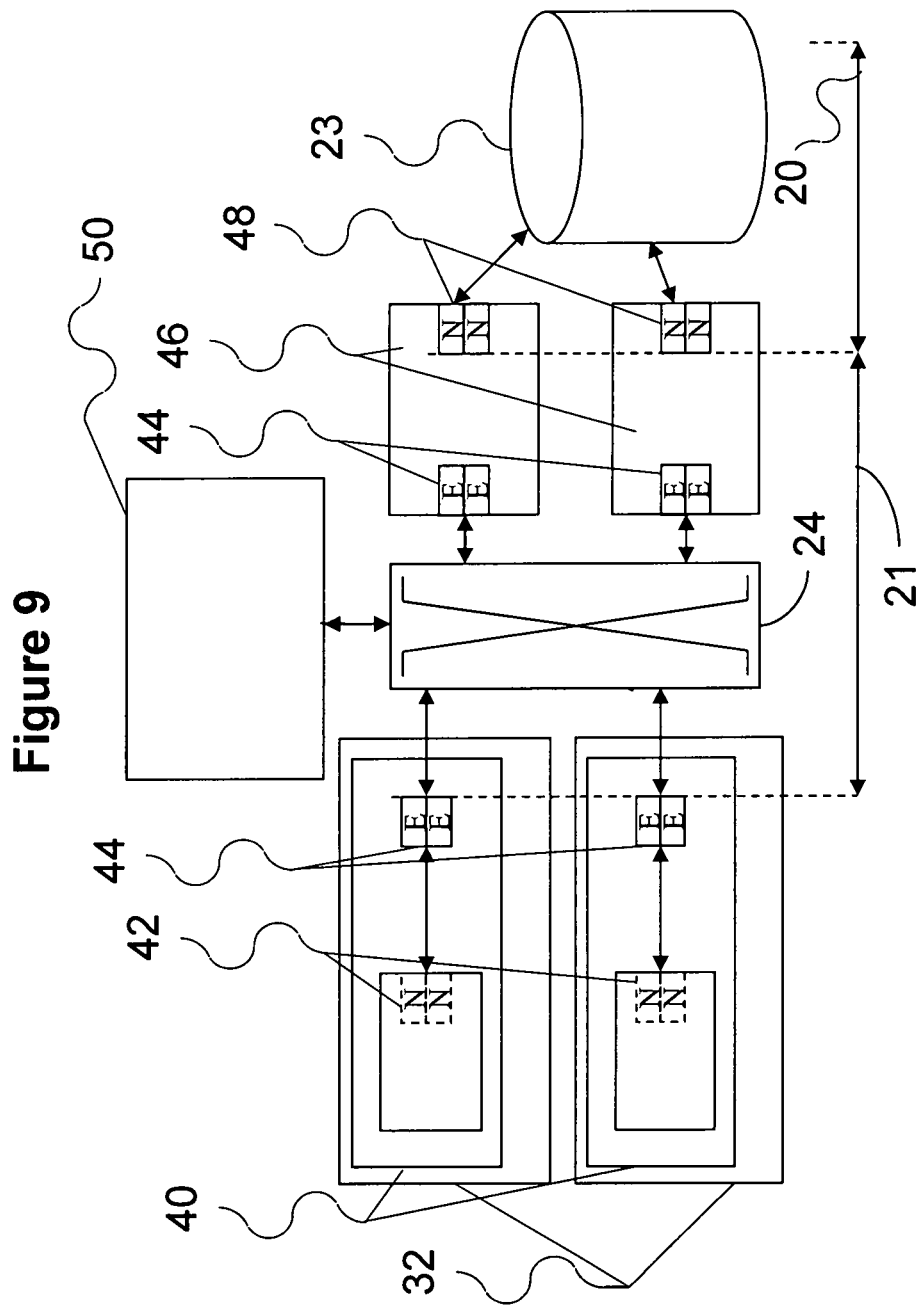
FIG. 9 is an illustration which shows a network topology containing an FCoE HBA, an FCoE Fabric, an FCoE Transformer and a Fibre Channel SAN.

FIG. 9 is a schematic depiction of an embodiment of the invention. A server 32 contains a FCoE Host Bus Adapter (HBA) 40. The FCoE HBA 40 contains a number of virtual Fibre Channel N-Ports 42 and an Ethernet interface 44. The FCoE HBA 40 is connected to an Ethernet layer 2 switch 24. The Ethernet layer 2 switch 24 is also connected to an FCoE Transformer 46. The Ethernet layer 2 switch 24 is also connected to an FCoE Fabric 50. The FCoE Transformer 46 is connected to the Fibre Channel SAN 2. Contained within the FCoE Transformer 46 are a number of real Fibre Channel N-Ports 48 that correspond to the virtual Fibre Channel N-Ports 42.

Figure 10:
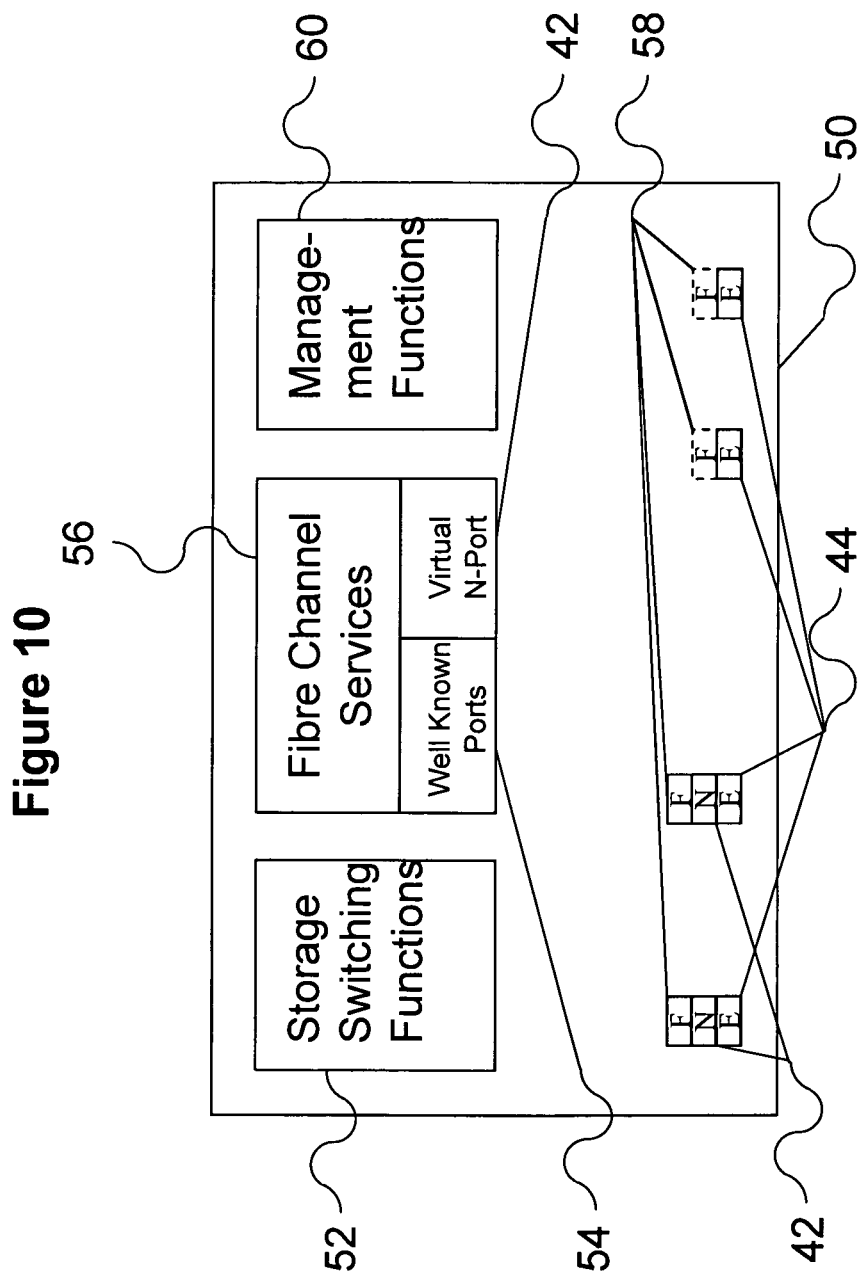
FIG. 10 is an illustration which shows the detail of an FCoE Fabric.

FIG. 10 is a schematic description of an embodiment of the invention showing the FCoE Fabric detail. The FCoE Fabric 50 contains apparatus to perform Fibre Channel services 56, operating on Well Known Fibre Channel ports 54 and Virtual Fibre Channel N-Ports 42. The FCoE Fabric 50 also contains a Management function 60 and a Storage Switching Function 52. The FCoE Fabric 50 also contains multiple Ethernet Interfaces 44 which are connected to either a Virtual Fibre Channel Port 42 or to a Virtual Fibre Channel F-Port 58. When connected to a Virtual Fibre Channel Port 42, the Virtual Fibre Channel Port 42 is connected to a Virtual Fibre Channel F Port 58.

Figure 11:
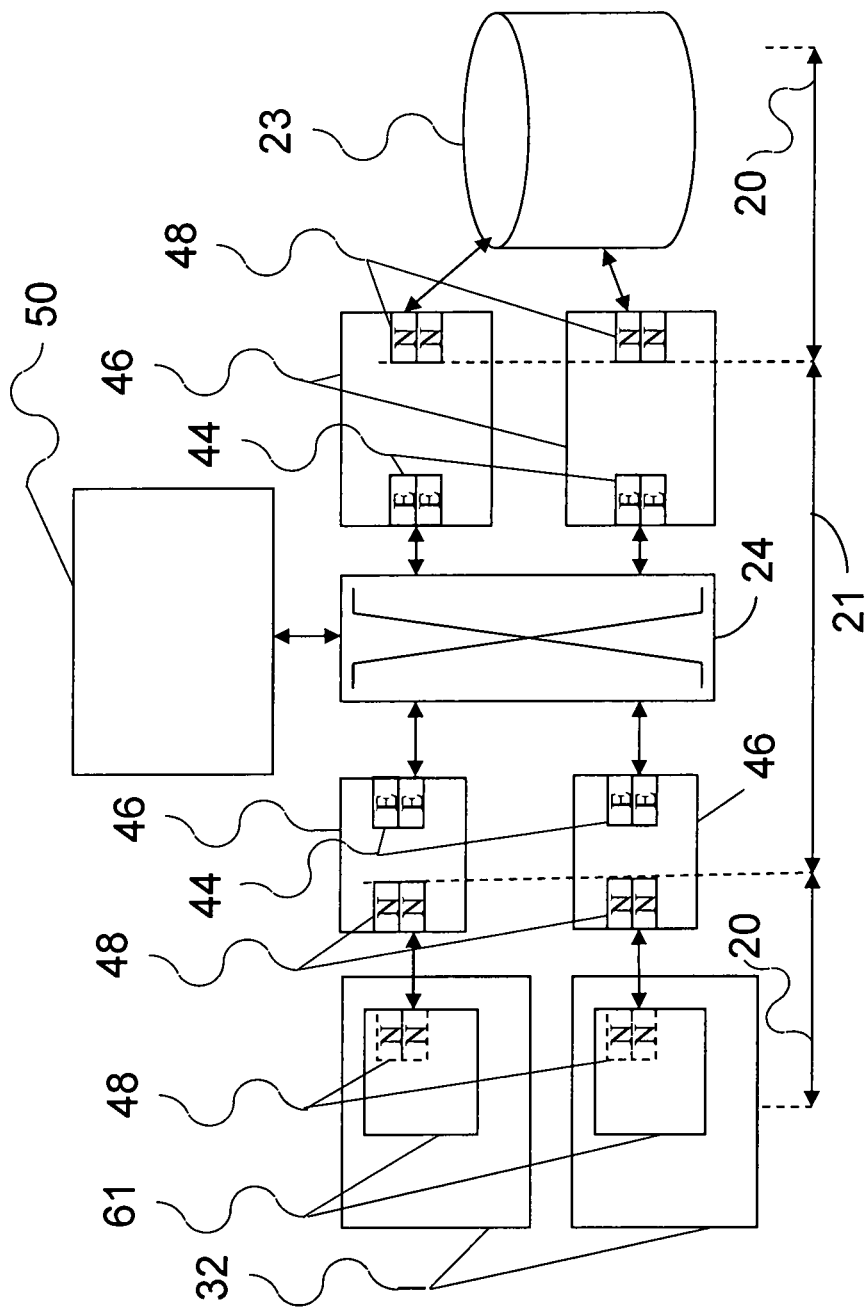
FIG. 11 is an illustration which shows a network topology containing a Fibre Channel HBA, FCoE Transformers, an FCoE Fabric and a Fibre Channel SAN.

FIG. 11 is a schematic depiction of an embodiment of the invention. A server 32 contains a Fibre Channel Host Bus Adapter (HBA) 61. The Fibre Channel HBA 61 contains a number of Fibre Channel N-Ports 62. The Fibre Channel HBA 61 is connected to an FCoE Transformer 46. The FCoE Transformer 46 is connected to an Ethernet layer 2 switch 24. The Ethernet layer 2 switch 24 is also connected to a second FCoE Transformer 46. The Ethernet layer 2 switch 24 is also connected to an FCoE Fabric 50. The second FCoE Transformer 46 is connected to the Fibre Channel SAN 20.

Figure 12:
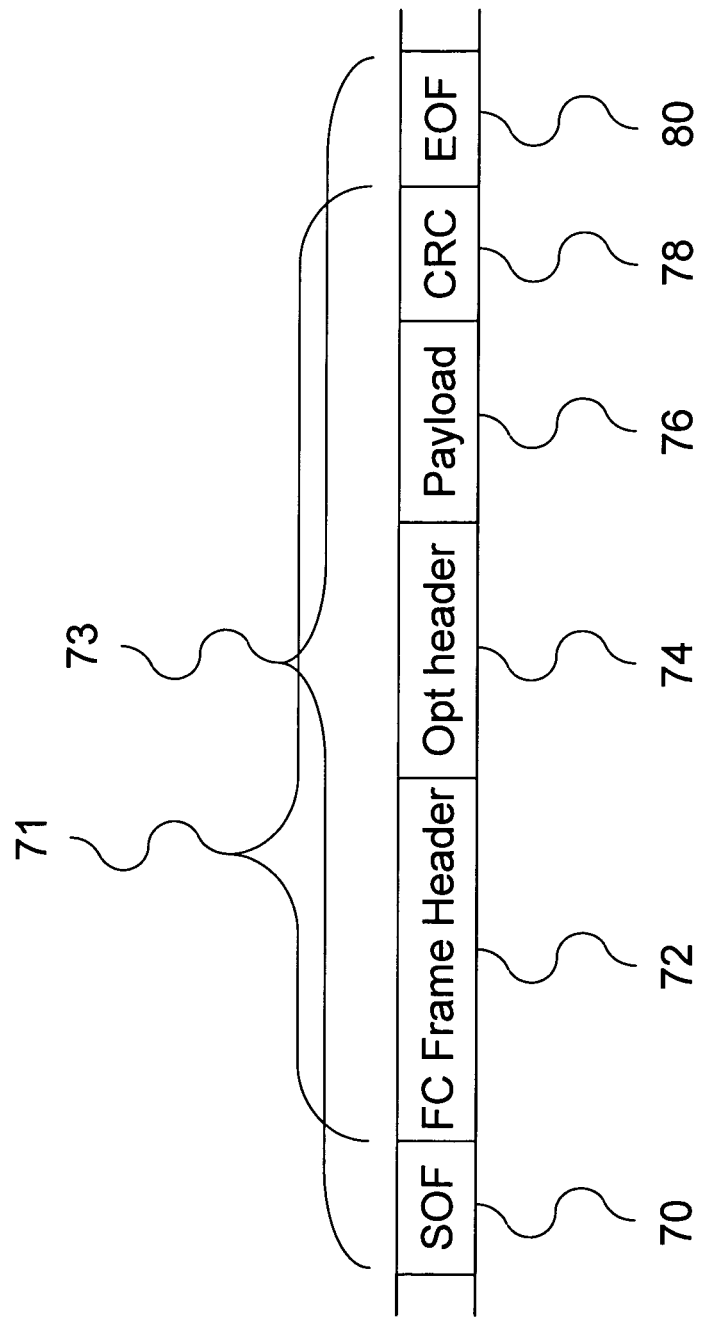
FIG. 12 is an illustration of the Fibre Channel frame format.

FIG. 12 generally illustrates the Fibre Channel frame format 71. A valid Fibre Channel frame with enclosing SOF, EOF characters 73 always starts with a Start Of Frame (SOF) delimiter 70. The SOF delimiter 70 is followed by the Fibre Channel Frame 71 including the Fibre Channel Frame Header 72. The Fibre Channel Frame Header 72 is optionally followed by one or more optional headers 74. A Fibre Channel frame 71 may contain a payload 76. A Fibre Channel frame 71 ends with a CRC field 78. A Fibre Channel Frame with enclosing SOF, EOF characters 73 ends with an End Of Frame (EOF) delimiter 80.

Figure 13:
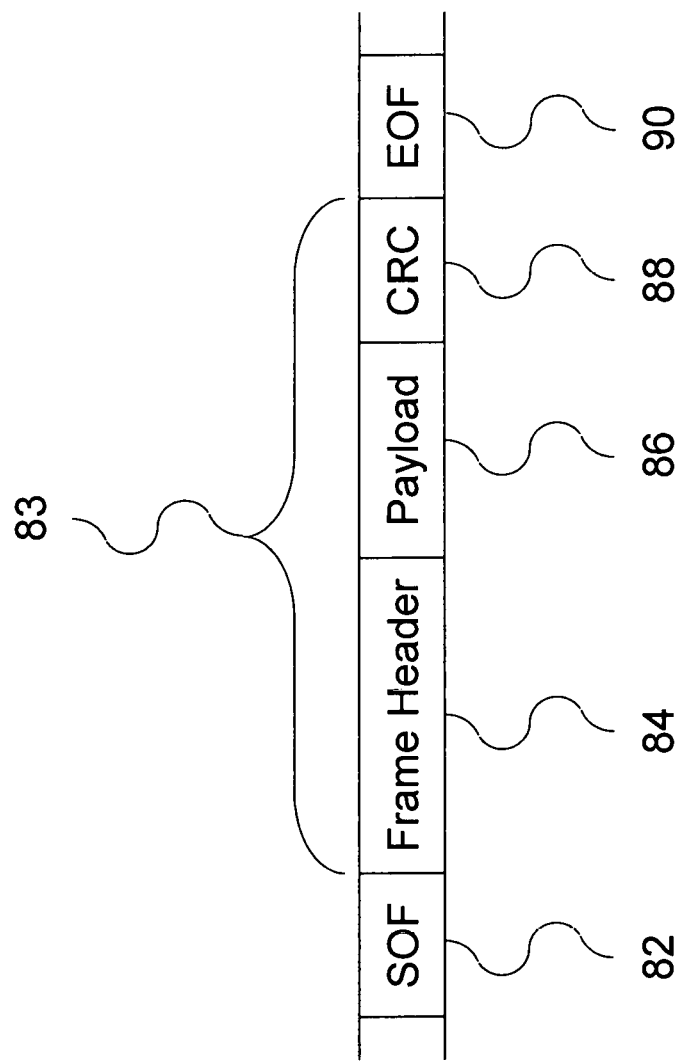
FIG. 13 is an illustration of the Ethernet frame format.

FIG. 13 generally illustrates the Ethernet frame format 83. A valid Ethernet frame 83 always starts with a Start Of Frame (SOF) delimiter 82. The SOF delimiter 82 is followed by the Ethernet Frame Header 84. An Ethernet frame 83 contains a payload 86. An Ethernet frame 83 ends with a CRC field 88 and an End Of Frame (EOF) delimiter 90.

Figure 14:
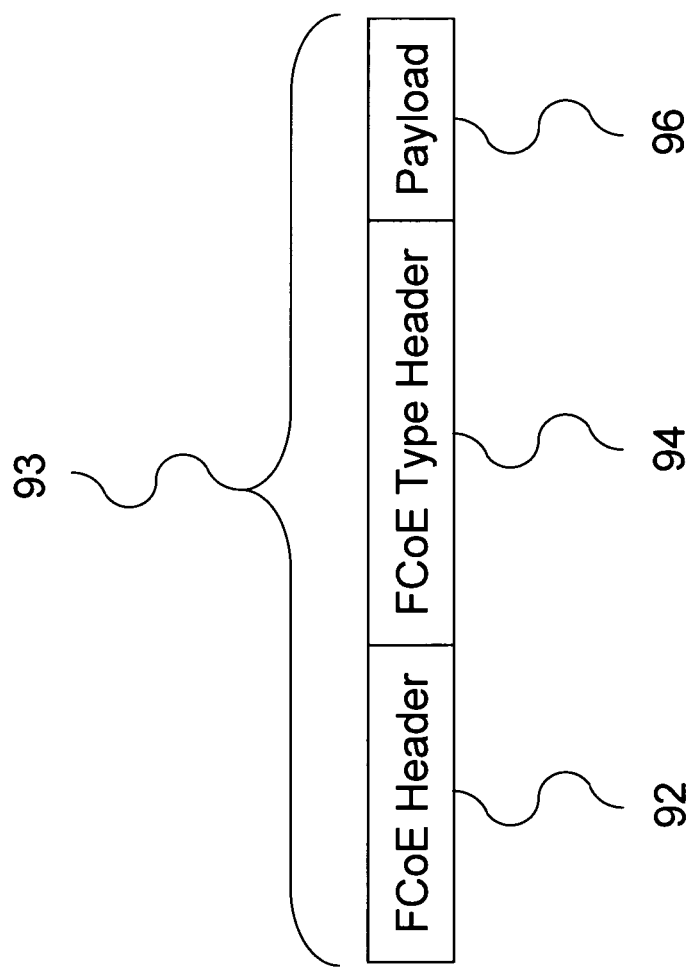
FIG. 14 is an illustration of the FCoE frame format.

FIG. 14 generally illustrates the Fibre Channel over Ethernet (FCoE) frame format 93. An FCoE frame 93 starts with an FCoE Header 92 and is followed by an FCoE Type Header 94. An FCoE frame 93 may contain a payload 96.

Figure 15:
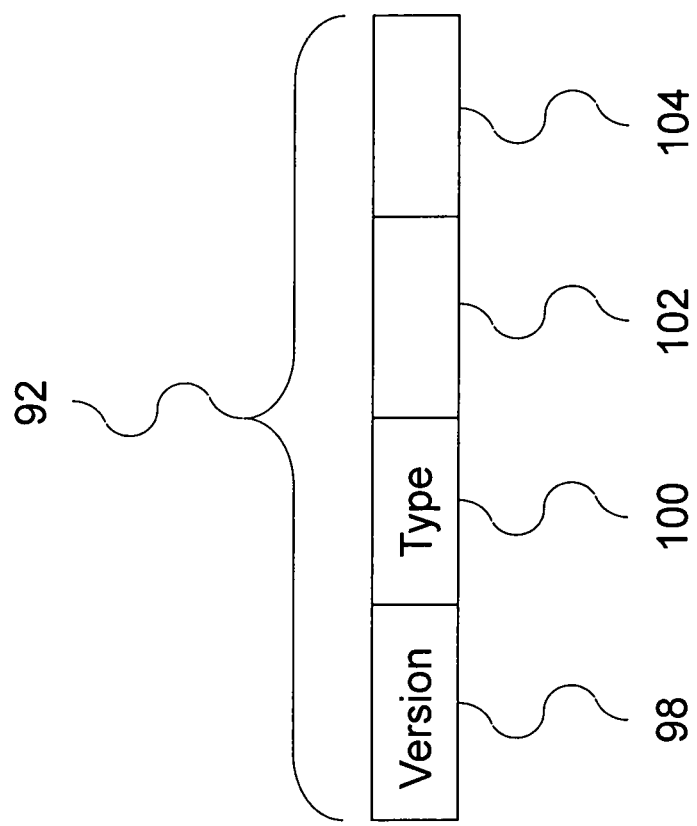
FIG. 15 is an illustration of the FCoE header format.

FIG. 15 generally illustrates the Fibre Channel over Ethernet (FCoE) Header format 92. An FCoE Header 92 starts with a Version field 98 and is followed by a Type field 100, an Interface Port Identifier field 102 and an Interface Identifier field 104.

Figure 16:
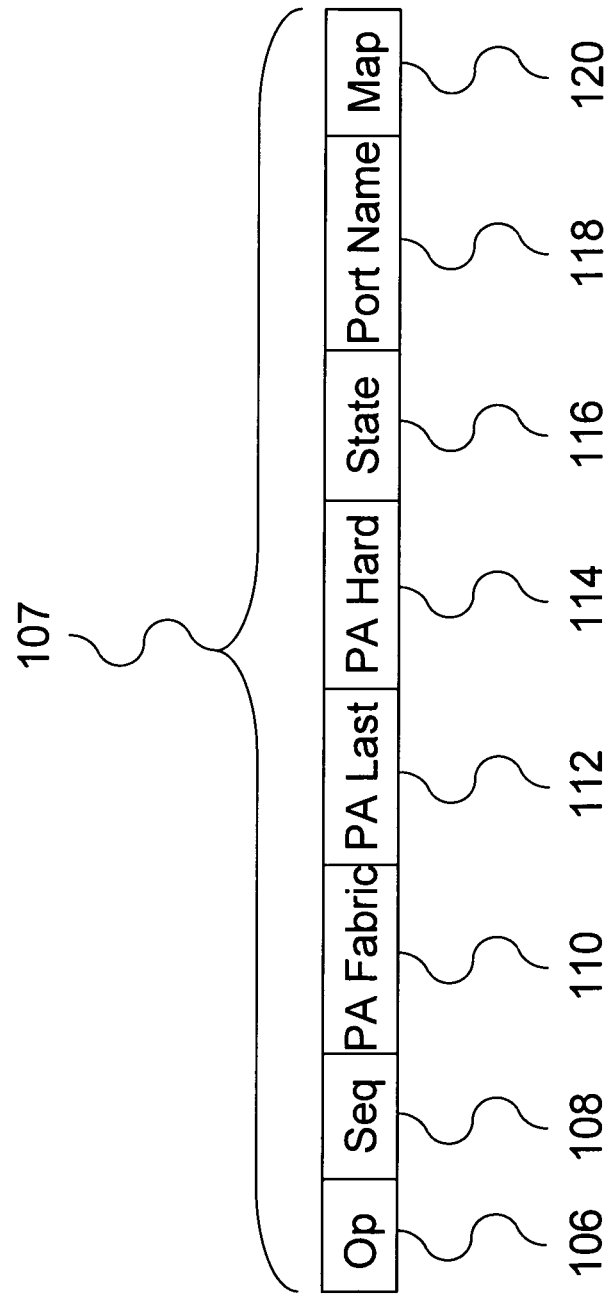
FIG. 16 is an illustration of the FCoE Association header format.

FIG. 16 generally illustrates the FCoE Association header 107. The FCoE Association header 107 is used for the FCoE Type header 94 when the Type field 100 is specified as Association. An FCoE Association Header 107 starts with an Operation field 106 and is followed by a Sequence field 108, a Fabric Physical Address field 110, a Last Physical Address field 112, a Hard Physical Address field 114, a state field 116, a Port Name field 118 and a Physical Address Map 120.

Figure 17:
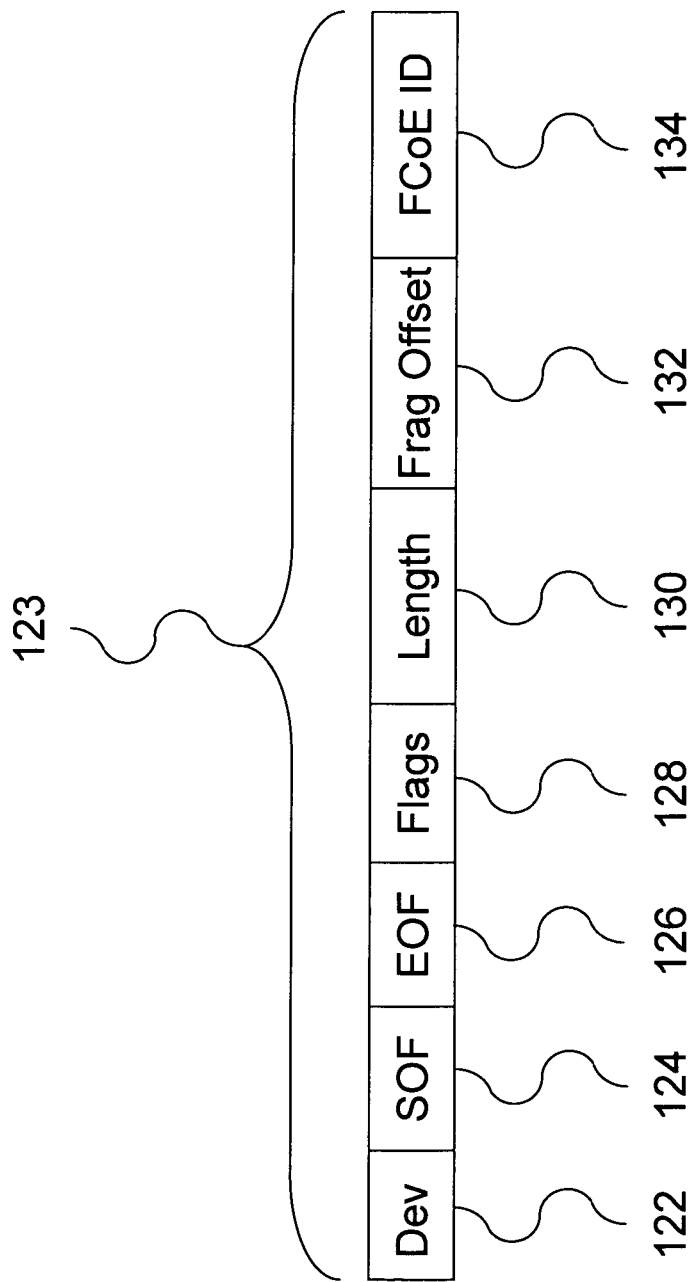
FIG. 17 is an illustration of the FCoE Transport header format.

FIG. 17 generally illustrates the FCoE Transport header 123. The FCoE Transport header 123 is used for the FCoE Type header 94 when the Type field 100 is specified as Transport. An FCoE Transport Header 123 starts with a Device field 122 and is followed by a Start Of Frame (SOF) field 124, an End Of Frame field 126, a flags field 128, a length field 130, a fragment offset field 132 and an FCoE ID field 134.

Figure 18:
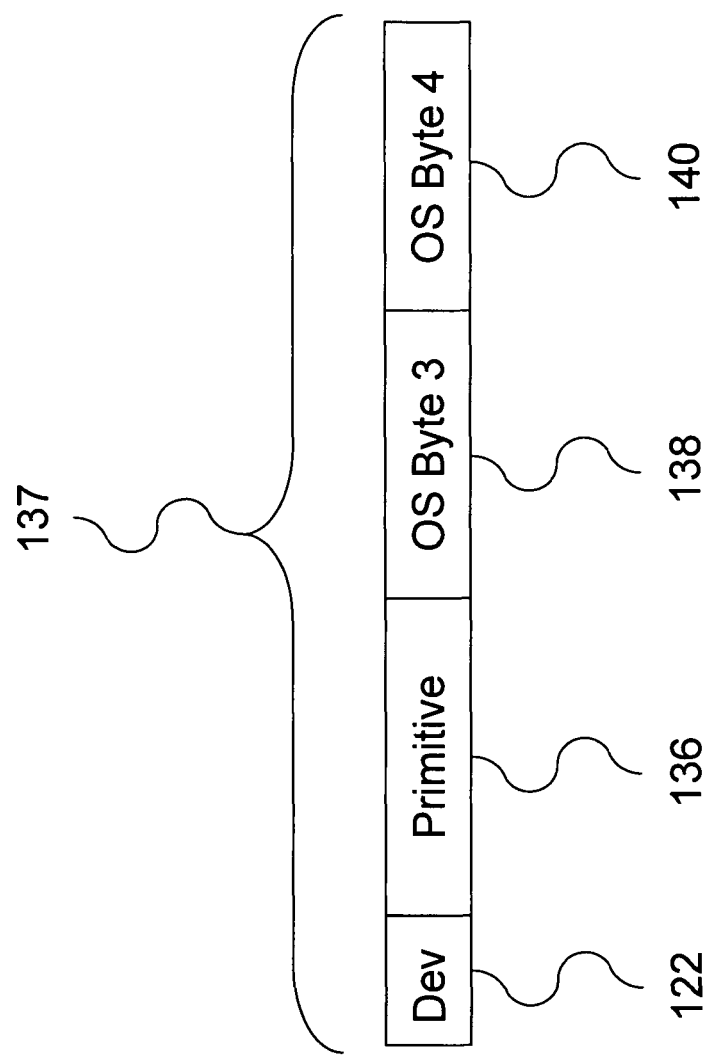
FIG. 18 is an illustration of the FCoE Primitive header format.

FIG. 18 generally illustrates the FCoE Primitive Header 137. The FCoE Primitive header 137 is used for the FCoE Type header 94 when the Type field 100 is specified as Primitive. An FCoE Primitive Header 137 starts with a Device field 122 and is followed by a Primitive field 136, an Ordered Set byte 3 field 138 and an Ordered Set byte 4 field 140.

Figure 19:
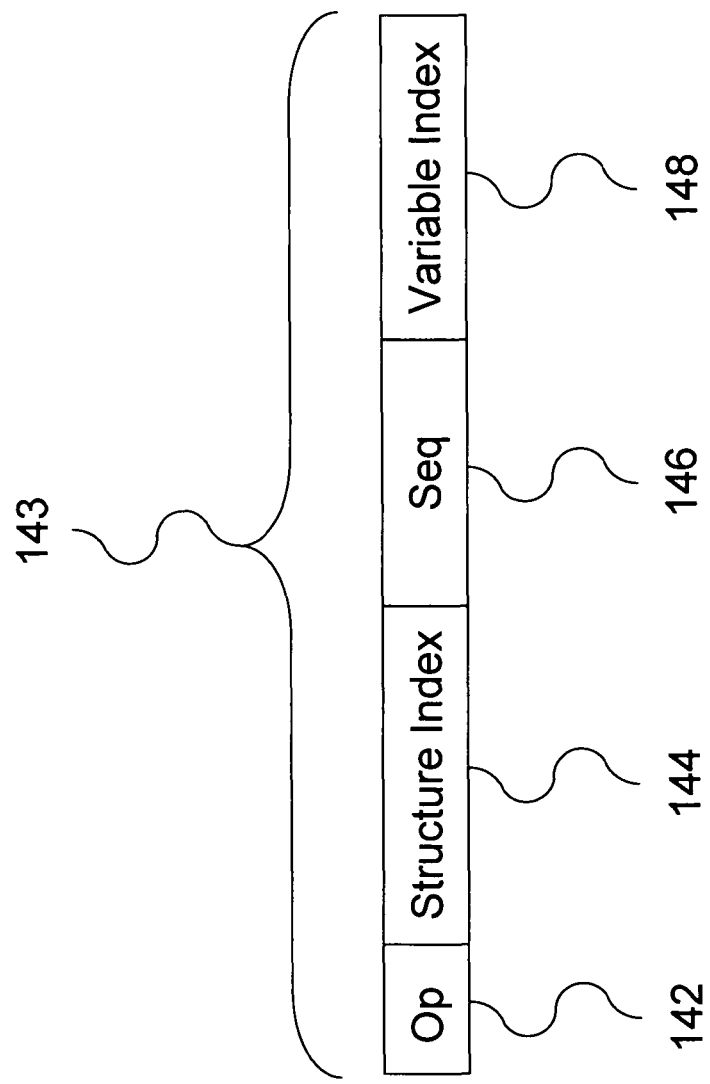
FIG. 19 is an illustration of the FCoE Management header format.

FIG. 19 generally illustrates the FCoE Management Header 143. The FCoE Management header 143 is used for the FCoE Type header 94 when the Type field 100 is specified as Management. An FCoE Management Header 143 starts with an Operation field 142 and is followed by a Structure Index field 144, a Sequence field 146 and a Variable Index field 148.

Figure 20:
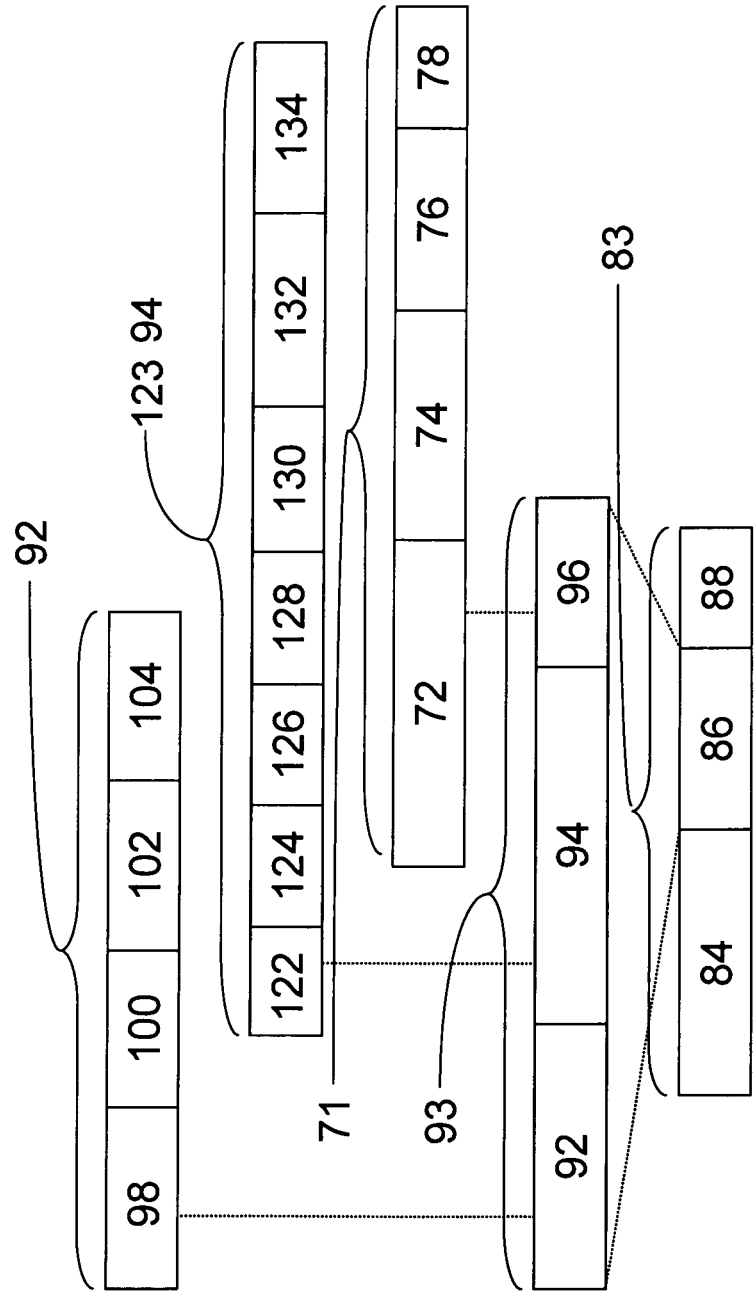
FIG. 20 is an illustration of an Ethernet frame containing a FCoE frame containing a Fibre Channel frame.
Figure 20A:
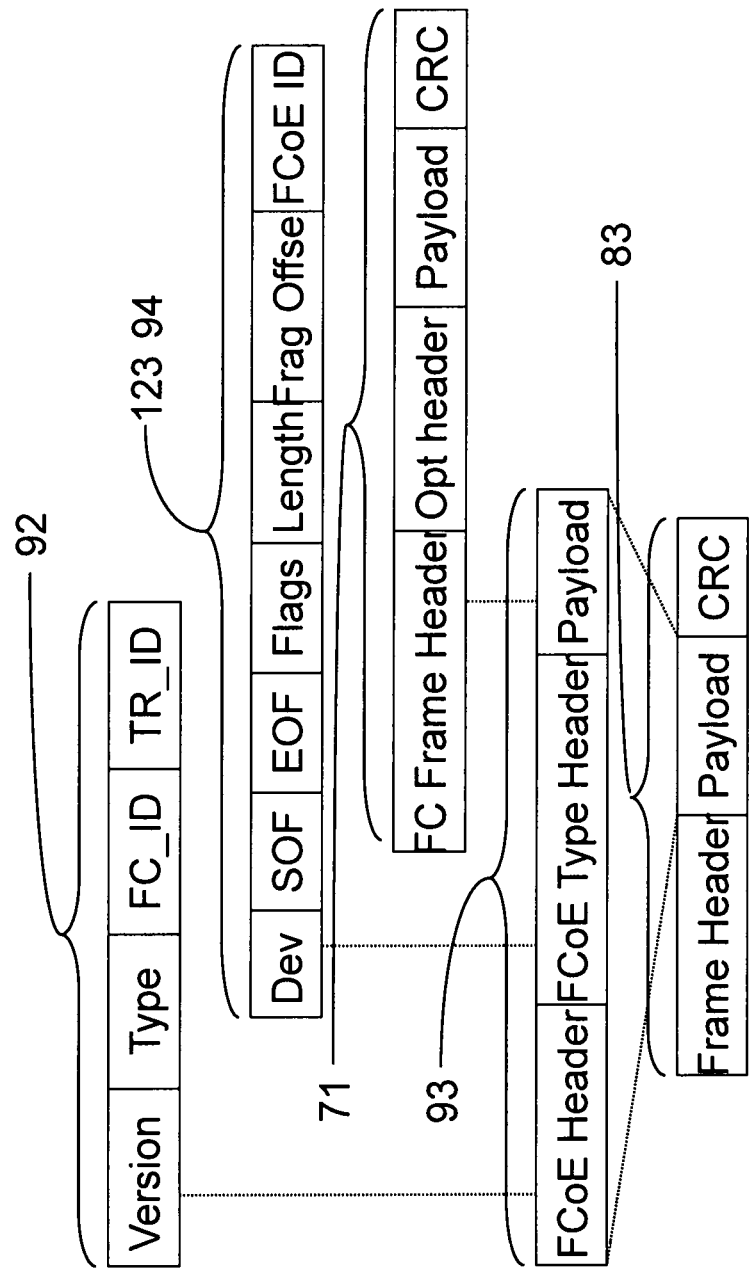
FIG. 20A is a continuation of FIG. 20, showing additional detailed of an Ethernet frame containing a FCoE frame containing a Fibre Channel frame.

FIGS. 20 and 20A generally illustrate a Fibre Channel frame 71 being transported in an FCoE frame 93 in an Ethernet frame 83. Within the FCoE frame 93, an FCoE Header 92 and an FCoE Transport header 123 are used.

Figure 21:
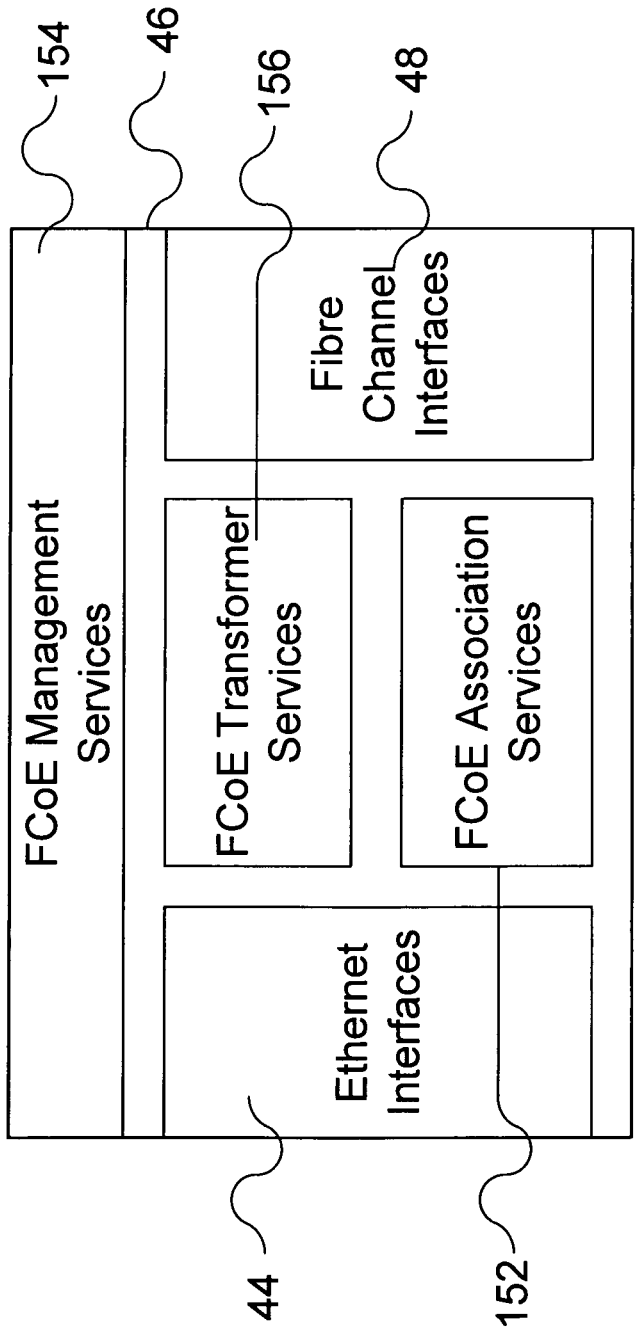
FIG. 21 is an illustration which shows the detail of an FCoE Transformer.

FIG. 21 is a schematic description of an embodiment of the invention showing the FCoE Transformer detail. The FCoE Transformer 46 contains one or more Ethernet interfaces 150, one or more Fibre Channel interfaces 158, apparatus to perform FCoE Management services 154, apparatus to perform FCoE Transformer services 156 and apparatus to perform FCoE Association services 152.

FIG. 22 is a schematic depiction of an embodiment of the invention. A server 32 contains and is connected to a FCoE Host Bus Adapter (HBA) 40. The FCoE HBA 40 is connected to an Ethernet LAN/SAN switch 36. The Ethernet LAN/SAN switch 36 is also connected to several FCoE Transformers 46. A second server 32 contains and is connected to a Fibre Channel HBA 61. The Fibre Channel HBA 61 is connected to an FCoE Transformer 46. The FCoE Transformer 46 is connected to the Ethernet LAN/SAN switch 36. Additional FCoE Transformers 46 are connected to the Ethernet LAN/SAN switch 36 and to other Fibre Channel SAN devices.

The Fibre Channel protocol has been designed as a layered protocol and generally follows the ISO reference protocol model shown in FIG. 1. In a layered protocol architecture, each layer has a specific responsibility. For example, the Data Link layer 2 of the ISO reference protocol model is responsible for providing and controlling access to the physical media described in the Physical layer 1. The Fibre Channel protocol provides services at the physical 1, Data Link 2, Network 3 and Transport 4 layers.

The Ethernet protocol has also been designed as a layered protocol and generally follows the ISO reference protocol model shown in FIG. 1. The Ethernet protocol provides services at the physical 1 and Data Link 2 layers.

Within a protocol architecture, most of the information is contained within the data frame and the various protocol headers and trailers. Some of the protocol information is external to the data frames. Examples of external data are the Start Of Frame characters 70, 82, the End Of Frame characters 80, 90 and Fibre Channel primitive signals and sequences. When information is external to the data frame and must be communicated over a non-native medium, such a Fibre Channel over Ethernet, a mechanism must exist to carry this external data.

II. Apparatus for Transporting Fibre Channel Over Ethernet

The apparatus for Transporting Fibre Channel over Ethernet is called an FCoE Transformer 46. An FCoE Transformer 46 is the interface between the Ethernet and the Fibre Channel networks. The FCoE Transformer 46 is responsible for converting the FCoE protocol to the Fibre Channel FC-1 protocol and vise-versa. Each FCoE Transformer 46 has at least two interfaces; an Ethernet interface 150 and a Fibre Channel interface 158. When initializing and associating with one or more Fibre Channel interfaces 158, the FCoE Transformer 46 performs link and loop initialization and participates in physical address assignment under the direction of commands received by an Ethernet interface 150. The details of the methods of operation of Associating with Fibre Channel over Ethernet devices are described below. Once initialized and associated, the FCoE Transformer 46 translates Fibre Channel Transmission Protocol 9 data frames and primitive sequences to and from FCoE frames. The novel use of the FCoE protocol and Ethernet as a replacement for the Fibre Channel Transmission Protocol 9 and Fibre Channel Physical Layer 8 protocols allows Ethernet devices to transport Fibre Channel data. The details of the methods of operation of Transporting Fibre Channel data over Ethernet are described below.

An FCoE Transformer 46 may be used between any Fibre Channel HBA 61, Fibre Channel Switch 22, Fibre Channel SAN 20, or other Fibre Channel interface and any FCoE HBA 40 or FCoE Fabric 50. Specifically, an FCoE Transformer 46 can be used between an FC HBA 61 and an FCoE Fabric 50 or it may be used between an FCoE Fabric 50 and a Fibre Channel SAN 20 or device. The details of the methods of operation of Managing Fibre Channel over Ethernet devices are described below.

III. Methods of Operation of Transporting Fibre Channel Over Ethernet

To transport Fibre Channel data over Ethernet, one must be able to differentiate between the various types of Fibre Channel data and have a method to appropriately process each type of data. Fibre Channel has three types of data, Fibre Channel frames 71, Fibre Channel Primitive signals and Fibre Channel Primitive Sequences. The details of the methods of operation of Transporting Fibre Channel Data Frames over Ethernet and the Transporting Fibre Channel Primitive Signals over Ethernet are described below. In one preferred embodiment, Fibre Channel primitive sequences are consumed by the FCoE Transformer 46 and the results are generally communicated through the FCoE Association method. The details of the methods of operation of Associating with Fibre Channel over Ethernet devices are described below. In another preferred embodiment, the primitive sequences are transported over Ethernet using the same mechanism as primitive signals.

To unambiguously describe the type of the Fibre Channel data carried within an FCoE frame 93, and the FCoE Transformer 46 and Fibre Channel interface 158 on a given FCoE Transformer 46 to whom it is destined, this information must be specified in all communications to and from a FCoE Transformer 46. This information is specified in the FCoE Header 92. The FCoE Header 90 is composed of a Version field 98, a Type field 100, an Interface Port Identifier field 102 and an Interface Identifier field 104. The Version field 98 is used to insure that the format of the FCoE Header 46 has not changed. The Type field 100 is used to determine the format and length of the FCoE Type Header 94 that immediately follows the FCoE Header 46. The Interface Port Identifier field 102 identifies which Fibre Channel interface 158 an FCoE frame 93 is referencing. The Interface Port Identifier field 102 is generally expected to be a ones based index of the Fibre Channel interfaces 158. The Interface Port Identifier field 102 can be eliminated in an alternative embodiment that supports only one Fibre Channel interface 158 per FCoE Transformer 46. The Interface Identifier field 104 unambiguously identifies an FCoE transformer 46 when it has more than Ethernet interfaces 150. The Interface Identifier field 104 is generally expected to contain the Ethernet Address of the first Ethernet interface 150. The Interface Identifier field 104 can be eliminated in an alternate embodiment that supports only one Ethernet interface 150 per Transformer 46.

IV. Methods of Operation of Transporting Fibre Channel Data Frames Over Ethernet When the FCoE Type 100 of the FCoE Header 92 is specified as Transport, the FCoE Header 92 is immediately followed by the FCoE Transport header 123. The FCoE Transport header 123 is composed of a series of fields 122, 124, 126, 128, 130, 132, 134 which allow a Fibre Channel frame to be carried and delivered unambiguously to its destination using one or more Ethernet frames 83 for transport. The device address field 122 contains the physical Fibre Channel address of the Fibre Channel device to which is being addressed through the FCoE Transformer 46.

Both gigabit Ethernet and Fibre Channel protocols use the same encoding mechanism, 8B/10B. While the same encoding mechanism is used, the method in which specific codes are used differs considerably. An example of this is how an SOF 70 and EOF 80 of a Fibre Channel frame are used and how an SOF 82 and EOF 90 of an Ethernet frame are used. In Ethernet, the SOF 82 character simply indicates the Start Of frame, while in Fibre Channel; the SOF 70 character indicates both the Start Of Frame and the frame class. Specifically, the SOF character 70 and the EOF character 80 vary depending upon the data contained within the Fibre Channel frame 71. The SOF character 70 is encoded into the SOF field 124 of the FCoE Transport header 123 of the FCoE frame 93. The EOF character 80 is encoded into the EOF field 126 of the FCoE Transport header 123 of the FCoE frame 93.

The flags field 128 contains implementation specific indicators. These indicators indicate when additional fragments follow and when the Fibre Channel CRC 78 is valid. The length field 130 contains the length of the Fibre Channel frame that forms the payload. The fragment offset field 132 indicates where in the receiving FCoE Transformer's 46 buffer the payload should be placed. The fragment offset field 132 is measured in units of 64 bytes (512 bits). When the fragment offset field 132 is set to zero, the payload should start at the beginning of the buffer. A non-fragmented FCoE Transport frame must have the fragment offset field 132 set to zero and must have the last fragment indicator in the flags field 128 set. This FCoE frame must be sent in a single Ethernet frame. The FCoE ID 134 contains a unique identification for each Fibre Channel frame. The FCoE ID 134 must be the same for all fragments of a single Fibre Channel frame. The FCoE ID 134 should be different for each new received Fibre Channel frame.

When a Fibre Channel frame 71 is received by an FCoE Transformer 46, it is specifically received by one of the Fibre Channel interfaces 158. The receiving Fibre Channel interface 158 sends the Fibre Channel frame 71 to the FCoE Transformer Services function 156.

The Fibre Channel Transformer Services function 156 creates an FCoE header 92 with the type field 100 set to Transport. The Fibre Channel Transformer Services function 156 sets the Version field 98, the Interface Port Identifier field 102 and the Interface Identifier field 104 to the correct values for the FCoE Transformer 46. The Fibre Channel Transformer Services function 156 then creates an FCoE type header 94 of type FCoE Transport header 123. The Fibre Channel Transformer Services function 156 sets the device field 122 to the Fibre Channel physical address of the Fibre Channel device from which the Fibre Channel frame 71 was received. The SOF field 124 is set to a unique value that corresponds to the SOF field 70 of the Fibre Channel frame 71. The EOF field 126 is set to a unique value that corresponds to the value of the EOF field 80 of the Fibre Channel frame 71. The values used in the SOF field 124 and the EOF field 126 may be equal to the 8-bit representation of the Fibre Channel SOF and EOF characters or any other value that allows an FCoE device to recognize the various SOF and EOF characters used by Fibre Channel.

If the complete Fibre Channel frame 71 will fit in the payload 96 of the FCoE frame 93, then the flags field 128 has the last offset bit set and the fragment offset field 132 is set to zero. The length field 130 is set to the length of the Fibre Channel frame 71. If the Fibre Channel CRC field 78 is valid, then the CRC valid bit in the flags field 128 is set. The FCoE ID field 134 is set to a unique value.

If the complete Fibre Channel frame 71 will not fit in the payload 96 of the FCoE frame 93, then the Fibre Channel frame 71 must be fragmented across several FCoE frames 93. For each frame other that the last frame, the flags field 128 must not have the last fragment bit or the CRC valid bit set. For the last frame, the flags field 128 must have the last fragment bit set and if the Fibre Channel CRC field 78 is valid, then the CRC valid bit in the flags field 128 must be set. For all FCoE frames 93 containing fragments of a single Fibre Channel frame 71, the fragment offset field 132 is set to the offset where the fragment begins. The length field 130 is set to the length of the data in the FCoE payload 96. The FCoE ID field 134 is set to a unique value that is the same for all Fibre Channel fragments.

Once the FCoE frame 93 or FCoE frames 93 have been constructed, they are sent to the Ethernet interface 150 for transmission. There is a one to one correspondence between the received Fibre Channel frames 71 and the transmitted FCoE frames 93 when the Fibre Channel frames 71 are not fragmented.

When an FCoE frame 93 is received by the Ethernet interface 150, the process is reversed. The Ethernet interface 150 sends the received FCoE frame 93 the FCoE Transformer Services function 156. The FCoE Transformer Services function 156 examines the FCoE type field 100. If the type field 100 is not set to Transport, the FCoE Transformer Services 156 processes the received FCoE frame 93 as described elsewhere in this document. If the type field is set to Transport, the FCoE payload 96 is extracted as the Fibre Channel frame 71. The Fibre Channel SOF 70 is set to the value in the SOF field 124. The Fibre Channel EOF 80 is set to the value in the EOF field 126. If the CRC valid bit not set in the flags field 128, then the Fibre Channel CRC is calculated and the CRC field 78 is set to the calculated value. If the last fragment bit is set in the flags field 128 and the fragment offset field 132 is set to zero, the entire Fibre Channel frame 71 is contained within a single FCoE frame 93. If either of the last fragment bit in the flags field 128 is not set or the fragment offset field 132 is non-zero, then the Fibre Channel frame 71 must be reassembled from the various FCoE fragments. A complete Fibre Channel frame 71 has been received when each the accumulated lengths of the fragments without the last fragment bit in the flags field 128 set equals the fragment offset field 132 of the FCoE fragment with the last fragment bit set in the flags field 128. All of the fragments must have the same value in the FCoE ID field 134 and must have a different value in the fragment offset field 132. The completed Fibre Channel frame 71 is then sent to the Fibre Channel interface 158 to be sent to the Fibre Channel device specified in the device field 122.

V. Methods of Operation of Transporting Fibre Channel Primitive Signals Over Ethernet When the FCoE Type 100 of the FCoE Header 92 is specified as Primitive, the FCoE Header 92 is immediately followed by the FCoE Primitive header 137. The FCoE Primitive header 137 is composed of a series of fields 122, 136, 138, 140 which allow a Fibre Channel primitive to be carried and delivered unambiguously to its destination using an Ethernet frame 83 for transport. The device address field 122 contains the physical Fibre Channel address of the Fibre Channel device that is being addressed through the FCoE Transformer 46. The primitive field 136 specifies the specific ordered set being carried by the FCoE Primitive header 137. Some ordered sets require one or two additional ordered sets to be specified. These additional ordered sets are specified in the OS byte 3 field 138 and the OS byte 4 field 140.

When a Fibre Channel primitive signal is received by an FCoE Transformer 46, it is specifically received by one of the Fibre Channel interfaces 158. The receiving Fibre Channel interface 158 sends the Fibre Channel primitive sequence to the FCoE Transformer Services function 156.

The Fibre Channel Transformer Services function 156 creates an FCoE header 92 with the type field 100 set to Primitive. The Fibre Channel Transformer Services function 156 sets the Version field 98, the Interface Port Identifier field 102 and the Interface Identifier field 104 to the correct values for the FCoE Transformer 46. The Fibre Channel Transformer Services function 156 then creates an FCoE type header 94 of type FCoE Primitive header 137. The Fibre Channel Transformer Services function 156 sets the device field 122 to the Fibre Channel physical address of the Fibre Channel device from which the Fibre Channel primitive sequence was received. The Primitive field 136 is set to the value of the primitive received. If the received primitive has ordered set specific values for bytes 3 and 4, these values are placed in the OS byte 3 138 and OS byte 4 140 fields respectively.

Once the FCoE frame has been constructed, it is sent to the Ethernet interface 150 for transmission. There is a one to one correspondence between the received Fibre Channel primitive signals and the transmitted FCoE frames 93. FCoE PR frames are never large enough to require fragmentation.

When an FCoE frame 93 is received by the Ethernet interface 150, the process is reversed. The Ethernet interface 150 sends the received FCoE frame 93 the FCoE Transformer Services function 156. The FCoE Transformer Services function 156 examines the FCoE type field 100. If the type field 100 is not set to Primitive, the FCoE Transformer Services 156 processes the received FCoE frame 93 as described elsewhere in this document. If the type field is set to Primitive, the primitive field 136 is extracted from the FCoE frame 93. A Fibre Channel primitive signal is created according to the value extracted from the primitive field 136. If the extracted primitive has ordered set specific values for bytes 3 and 4, these values are extracted from the OS byte 3 138 and OS byte 4 140 fields respectively. The completed Fibre Channel primitive signal is then sent to the Fibre Channel interface 158 to be sent to the Fibre Channel device specified in the device field 122.

VI. Methods of Operation of Associating with Fibre Channel Over Ethernet Devices The FCoE protocol provides a mechanism for an FCoE Transformer 46 to dynamically associate with one or more Ethernet interfaces 150 on either FCoE HBAs 40 or FCoE Fabrics 50. This enables FCoE HBAs 40 or FCoE Fabrics 50 to have a Fibre Channel Physical Addresses (FC-PA) assigned to it. The novel ability of an Ethernet interface 44 to have a Fibre Channel physical address assigned to it enable the Ethernet devices 40, 50 to communicate with Fibre Channel devices without being directly connected to the Fibre Channel network. The FCoE Transformer 46 maps the Fibre Channel physical addresses to Ethernet MAC addresses. The FCoE Transformer 46 only performs this mapping when it has been instructed to establish link with the Fibre Channel fabric, loop or device. An FCoE Transformer 46 may be associated with more than one Ethernet interface 44. The FCoE Association method includes a method to dynamically discover FCoE Transformers 46 and Interfaces, and a method to dynamically associate and disassociate with an FCoE Transformer 46 or a device performing FCoE Transformer 46 functionality.

When the FCoE Type 100 of the FCoE Header 92 is specified as Association, the FCoE Header 92 is immediately followed by the FCoE Association header 107. The FCoE Association header 107 is composed of a series of fields 106, 108, 110, 112, 114, 116, 118, 120 which allow an FCoE Interface to discover and associate with an FCoE Transformer 46. The Operation field 106 can be set to one of the following values; Interface Announce, Interface Query, Link Control, Link State, Link Query. The Sequence field 108 indicates that the value of the state field 116 has changed. All FCoE Transformers 46 must increment this field any time the state field 116 in a transmitted FCoE Association header 107 is different from the last transmitted value. The Physical Address Fabric field 110 is only valid in a Link Control operation. The Physical Address Fabric field 110 is set to the last Fibre Channel physical address assigned by the Fibre Channel fabric during the Fibre Channel fabric login process. If no address has been assigned by the Fibre Channel fabric, the Physical Address Fabric field 110 should be set to unassigned. The Physical Address Last field 112 is only valid in a Link Control or a Link State operation. In a Link Control operation, the Physical Address Last field 112 is set to the last physical address that was assigned to the Ethernet interface 44. In a Link State operation, the Physical Address Last field 112 is set to the physical address that has just been assigned to the Ethernet interface 44 by the FCoE Transformer. If no address has been previously assigned by the FCoE Transformer 46, the Physical Address Last field 112 should be set to unassigned. The Physical Address Hard field 114 is only valid in a Link Control operation. The Physical Address Fabric Hard 114 is set to the specific Fibre Channel physical address requested by the Ethernet interface hardware, such as a switch on the front panel of the device. If no specific address has been requested by the Ethernet interface, the Physical Address Hard field 114 should be set to unassigned. The State field 116 contains a description of the Fibre Channel and Ethernet capabilities of the FCoE Transformer 46 as requested by the Ethernet interface 44 or as provided by the FCoE Transformer 46. The Port Name field 118 contains the Fibre Channel world wide name associated with the Ethernet interface 44. The Map field 120 contains a map of all Fibre Channel devices attached to the FCoE Transformer 46 on the Fibre Channel port described by the IN_PI field 102. The format of the Map field is defined in the Fibre Channel Arbitrated Loop specification.

When an FCoE Transformer 46 is initialized, it establishes link on its Ethernet interfaces 150. It does not establish link with its Fibre Channel interfaces 158 at this time. After the Ethernet link is established, the FCoE Association Services function 152 periodically broadcasts an FCoE Association message 107 with the operation field 106 set to Interface Announce. An FCoE Transformer 46 broadcasts these messages until the FCoE Association Services function 152 receives an FCoE Association message with the type field set to Link Control. These FCoE Interface Announce messages are broadcast at intervals of 0.1 seconds to 1 second.

When an FCoE HBA 40 is initialized, it establishes link with its Ethernet interface 44. After the Ethernet link is established, the FCoE Association Services function 152 broadcasts an FCoE Association message 107 with the operation field 106 set to Interface Query to determine what FCoE Fabrics and FCoE Transformers are connected to the Ethernet.

When an FCoE Transformer 46 receives an FCoE Interface Query message, it responds with a unicast FCoE Interface Announce message. When an FCoE HBA 40 receives an FCoE Interface Announce message from an FCoE Transformer 46 it saves the Ethernet address of the FCoE Transformer 46 in an interface table. With the Ethernet address, the FCoE HBA 40 can now instruct the FCoE Transformer 46 to establish the Fibre Channel link and obtain a Fibre Channel Physical Address An FCoE HBA 40 can discover an FCoE Transformer 46 based on either an Interface Announce broadcast or an Interface Announce unicast response to an Interface Query message. An FCoE Transformer 46 can discover an FCoE HBA 40 based on either an Interface Query message broadcast or a Link Config message.

Once an FCoE Transformer 46 has been discovered by an FCoE HBA 40, the FCoE HBA 40 may request that the FCoE Transformer 46 initialize its Fibre Channel interface 158 and have a Fibre Channel Physical Address assigned. The FCoE HBA 40 sends an FCoE Association Link Control message to the FCoE Transformer 46. This message contains the Fibre Channel Port Name 118, the desired physical address 114, the last physical address 112, the last fabric assigned physical address 110 and the desired link characteristics 116. Upon receiving an FCoE Association Link Control message, the FCoE Transformer 46 attempts to establish the Fibre Channel link in accordance with the parameters specified in the message. Upon success or failure, the FCoE Transformer 46 responds with an FCoE Association Link State message. On success, the FCoE Transformer 46 adds the assigned Fibre Channel Physical Address and the FCoE HBA's 40 Ethernet address into a table so that subsequent traffic can be transformed between the Fibre Channel and the Ethernet networks.

If the link on the Fibre Channel interface 158 fails, for any reason, the FCoE Transformer 46 sends an FCoE Association Link State message to each of the associated FCoE HBAs 40 indicating that the Fibre Channel link is down. The FCoE Transformer 46 (re)establishes Fibre Channel link when it receives a subsequence FCoE Association Link Control message from the FCoE HBA 40.

An FCoE HBA 40 can change the link state at any time by sending an FCoE Association Link Control message to the FCoE Transformer 46. Each Link Control message is responded to by an FCoE Association Link State message.

An FCoE HBA 40 can query the link state by sending an FCoE Association Link Query message. The response to a Link Query message is a Link State message.

Both the FCoE HBA 40 and the FCoE Transformer 46 maintain tables of Fibre Channel Physical Addresses and Fibre Channel Port Names to Ethernet address mapping. When either the FCoE HBA 40 or the FCoE Transformer 46 loses link on the Ethernet interface 44, 150, the associated mapping table entries must be flushed.

VII. Methods of Operation of Managing Fibre Channel Over Ethernet Devices

The FCoE protocol is designed as an alternative to the Fibre Channel FC-1 protocol. It is an Ethernet based layer 2 protocol. Because FCoE is used in an Ethernet environment, it is expected that hosts with FCoE HBAs 40 and FCoE Fabrics 50 will use SNMP or a similar, widely deployed network management protocol. However, given the desire to build small, simple FCoE Transformers 46 that do not have the ability to run a TCP/IP protocol stack necessary to implement SNMP, there is a requirement for a companion to the existing FCoE protocols to implement a simple management function. FCoE Management is meant to be implemented in the spirit of both the FCoE protocol and the SNMP protocol. Alternative embodiments may use other management protocols or completely eliminate the management function.

When the FCoE Type 100 of the FCoE Header 92 is specified as Management, the FCoE Header 92 is immediately followed by the FCoE Management header 143. The FCoE Management header 143 is composed of a series of fields 142, 144, 146, 148 which allow an FCoE management command or response to be carried and delivered unambiguously to its destination using an Ethernet frame 83 for transport. The Operation field 142 can be set to one of the following values; Get Variable, Set Variable, Valid Response, Invalid Response. The Structure Index field 144 describes which group of variables the request should operate on. The Structure Index field 144 can be set to one of the following values; ConnUnitPortEntry, ConnUnitPortStatEntry. The Sequence field 146 is used to match FCoE management requests with responses. The Sequence field 146 of a management response must have the same value as the management request. The Variable Index field 148 specifies the management variable being operated on. The FCoE payload field 96 contains the value of the variable specified by the variable index field 148.

When an FCoE frame 93 is received by the Ethernet interface 150, the Ethernet interface 150 sends the received FCoE frame 93 to the FCoE Transformer Services function 156. The FCoE Transformer Services function 156 examines the FCoE type field 100. If the type field 100 is not set to Management, the FCoE Transformer Services 156 processes the received FCoE frame 93 as described elsewhere in this document. If the type field is set to Management, the FCoE Management frame is sent to the FCoE Management Services function 154. The FCoE Management Services function 154 extracts the operation from the operation field 142. If the extracted operation is not Get Variable or Set Variable, an FCoE Management response with the operation field set to Invalid Response is returned to the FCoE Management requestor. If the extracted operation is Get Variable or Set Variable, the management variable is extracted from the Structure Index field 144 and the Variable Index field 148. If the management variable is valid, the given operation is performed. If the operation is Set Variable, the given variable is set to the value contained in the payload field 96. An FCoE Management response frame is created from the original FCoE frame 93. The same FCoE Header 92 may be used. The same FCoE Management Header 143 may be used. The operation field 142 is set to Valid Response. The Structure Index 144 and Variable Index 148 are set to the Structure Index 144 and Variable Index 148 values from the FCoE Management request. The sequence field 146 is set to the sequence field 146 value from the FCoE Management request. If the operation field 142 of the Management request was set to Get Variable, the value of the requested variable is placed in the payload field 96. Once the FCoE Management response has been completed, it is sent to the Ethernet interface 150 for transmission back to the requestor.

FCoE Management requests can only be received by the Ethernet interfaces 150.

VIII. Alternative Embodiments of Transporting Fibre Channel Over Ethernet

A preferred embodiment is a Fibre Channel interface with a remote Fibre Channel interface.

Another preferred embodiment is an FCiP interface with a remote Fibre Channel interface.

Another preferred embodiment is an iFCP interface with a remote Fibre Channel interface.

Another preferred embodiment is a Fibre Channel firewall using Ethernet devices.

Another preferred embodiment is performing Fibre Channel storage data virtualization using Ethernet devices.

Another preferred embodiment is performing Fibre Channel data replication using Ethernet devices.

Another preferred embodiment is unifying Fibre Channel and Ethernet on the backplane of a computer or cluster of computers.

Another preferred embodiment is a Fibre Channel Host Bus Adapter (HBA) using an Ethernet NIC.

Another preferred embodiment is host access of Fibre Channel based data using Ethernet devices.

Another preferred embodiment is transporting SCSI traffic over Fibre Channel over Ethernet.

Another preferred embodiment is performing Fibre Channel data erasure using Ethernet devices.

Another preferred embodiment is transporting encrypted SCSI traffic over Fibre Channel over Ethernet.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a efficient means for transporting Fibre Channel over Ethernet that have been disclosed above are intended to educate the reader about preferred embodiments of the invention, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

1 Layer 1 Protocol; Physical Layer
2 Layer 2 Protocol; Data Link Layer
3 Layer 3 Protocol; Network Layer
4 Layer 4 Protocol; Transport Layer
5 Layer 5 Protocol; Session Layer
6 Layer 6 Protocol; Presentation Layer
7 Layer 7 Protocol; Application Layer
8 Fibre Channel Physical Layer
9 Fibre Channel Transmission Protocol
10 Fibre Channel Signaling Protocol
11 Fibre Channel Layer 3 Protocol
12 Fibre Channel Upper Layer Protocol Interface Protocol
13 Ethernet Physical Layer
14 Ethernet Media Access Control Layer
15 Ethernet Logical Link Control
16 Fibre Channel Upper Layer Protocol
17 FCoE Protocol
18 Ethernet Upper Layer Protocol
20 SAN
21 LAN
22 Fibre Channel Switch
23 Fibre Channel Device
24 Layer 2 Ethernet Switch
26 Layer 4-7 Ethernet Switch
28 Firewall
30 Router
32 Server
34 Layer 2-7 Ethernet Switch
36 Merged LAN/SAN Switch
40 FCoE HBA
42 Virtual Fibre Channel Port
44 Ethernet interface
46 FCoE Transformer
48 Fibre Channel Interface
50 FCoE Fabric
52 Storage Switching Function
54 Well Known Fibre Channel Ports
56 Fibre Channel Services
58 Virtual Fibre Channel F-Port
60 FCoE Management Functions
61 FC HBA
62 Real Fibre Channel N-Port within an FC HBA
70 SOF field, Fibre Channel Frame
71 Fibre Channel Frame
72 Frame Header, Fibre Channel Frame
73 Fibre Channel Frame with enclosing SOF, EOF characters
74 Optional Header, Fibre Channel Frame
76 Payload field, Fibre Channel Frame
78 CRC field, Fibre Channel Frame
80 EOF field, Fibre Channel Frame
82 SOF field, Ethernet Frame
83 Ethernet Frame
84 Frame Header, Ethernet Frame
86 Payload field, Ethernet Frame
88 CRC field, Ethernet Frame
90 EOF field, Ethernet Frame
92 FCoE Header, FCoE Frame
93 FCoE Frame
94 FCoE Type Header, FCoE Frame
96 Payload field, FCoE Frame
98 Version field, FCoE Header
100 Type field, FCoE Header
102 Interface Port Identifier field, FCoE Header
104 Interface Identifier field, FCoE Header
106 Operation field, FCoE Association Header
108 Sequence field, FCoE Association Header
110 Physical Address Fabric field, FCoE Association Header
112 Physical Address Last field, FCoE Association Header
114 Physical Address Hard field, FCoE Association Header
116 State field, FCoE Association Header
118 Port Name field, FCoE Association Header
120 Map field, FCoE Association. Header
122 Device field, FCoE Transport Header
123 FCoE Transport Header
124 SOF field, FCoE Transport Header
126 EOF field, FCoE Transport Header
128 Flags field, FCoE Transport Header
130 Length field, FCoE Transport Header
132 Fragment Offset field, FCoE Transport Header
134 FCoE ID field, FCoE Transport Header 136 Primitive field, FCoE Primitive Header
137 FCoE Primitive Header
138 Ordered Set Byte 3 field, FCoE Primitive Header
140 Ordered Set Byte 4 field, FCoE Primitive Header
142 Operation field, FCoE Management Header
143 FCoE Management Header
144 Structure Index field, FCoE Management Header
146 Variable Index field, FCoE Management Header
150 Ethernet interface, FCoE Transformer
152 FCoE Association Services, FCoE Transformer
154 FCoE Management Services, FCoE Transformer
156 FCoE Transformer Services, FCoE Transformer
158 Fibre Channel interface, FCoE Transformer

What is claimed is:

1. A method comprising the steps of:
providing a Server (32) including an FCoE HBA (40);
said FCoE HBA (40) including a Virtual Fibre Channel Port (42) and an Ethernet Interface (44);
providing a Layer 2 Ethernet Switch (24);
providing an FCoE Transformer (46) including an Ethernet Interface (44) and a Fibre Channel Interface (48);
providing a Fibre Channel Device (23);
said FCoE HBA (40) sending an FCoE Frame (93) to said FCoE Transformer (46) via said Layer 2 Ethernet Switch (24);
said FCoE Frame (93) is conveyed in an Ethernet Frame (83) without utilizing an IP packet;
said FCoE Transformer (46) converting said FCoE Frame (93) to a Fibre Channel Frame (71);
said FCoE Frame (93) including an SOF field (124) for providing an SOF character used to start said Fibre Channel Frame (71); said SOF field (124) for encoding said SOF field Fibre Channel Frame (70);
said FCoE Frame (93) including an EOF field (126) for providing an EOF character used to end said Fibre Channel Frame (71); said EOF field (126) for encoding said EOF field Fibre Channel Frame (80); and
said FCoE Transformer (46) sending said Fibre Channel Frame (71) to said Fibre Channel Device (23).

2. A method as recited in claim 1 in which:
said FCoE Frame (93) includes an Interface Port Identifier field (102) and an Interface Identifier field (104).

3. A method comprising the steps of:
providing a Server (32) including an FCoE HBA (40);
said FCoE HBA (40) including an Ethernet Interface (44);
providing a Layer 2 Ethernet Switch (24);
providing an FCoE Transformer (46);
said FCoE Transformer (46) including an Ethernet Interface (44) and a Fibre Channel Interface (48);
providing an FCoE Fabric (50) including a plurality of Ethernet Interfaces (44), and a plurality of Fibre Channel Ports (54);
providing a Fibre Channel Device (23);
said FCoE HBA (40) sending an FCoE Frame (93) to said FCoE Fabric (50) via said Layer 2 Ethernet Switch (24);
said FCoE Frame (93) is conveyed in an Ethernet Frame (83) without utilizing an IP packet and without requiring the use of IP packets to encapsulate the Fibre Channel data;
said FCoE Fabric (50) sending said FCoE Frame (93) to said FCoE Transformer (46) via said Layer 2 Ethernet Switch (24);
said FCoE Transformer (46) converting said FCoE Frame (93) to a Fibre Channel Frame (71);
said FCoE Frame (93) including an SOF field (124) for providing an SOF character used to start said Fibre Channel Frame (71); said SOF field (124) for encoding said SOF field Fibre Channel Frame (70);
said FCoE Frame (93) including an EOF field (126) for providing an EOF character used to end said Fibre Channel Frame (71); said EOF field (126) for encoding said EOF field Fibre Channel Frame (80); and
said FCoE Transformer (46) sending said Fibre Channel Frame (71) to said Fibre Channel Device (23).

4. A method as recited in claim 3 in which:
said FCoE Frame (93) includes an Interface Port Identifier field (102) and an Interface Identifier field (104).

5. A method comprising the steps of:
providing a Server (32) including an FCoE HBA (40);
said FCoE HBA (40) including an Ethernet Interface (44);
providing a Layer 2 Ethernet Switch (24);
providing an FCoE Transformer (46);
said FCoE Transformer (46) including an Ethernet Interface (44) and a Fibre Channel Interface (48);
providing an FCoE Fabric (50) including a plurality of Ethernet Interfaces (44), and a plurality of Fibre Channel Ports (54);
providing a Fibre Channel Device (23);
said FCoE HBA (40) sending an FCoE Frame (93) to said FCoE Fabric (50) via said Layer 2 Ethernet Switch (24);
said FCoE Frame (93) is conveyed in an Ethernet Frame (83) without utilizing an IP packet and without requiring the use of IP packets to encapsulate the Fibre Channel data;
said FCoE Frame (93) is sent to said FCoE Fabric (50) based in information fields contained in an FCoE Header (92) and an FCoE Type Header (94),
said FCoE Fabric (50) sending said FCoE Frame (93) to said FCoE Transformer (46) via said Layer 2 Ethernet Switch (24);
said FCoE Transformer (46) converting said FCoE Frame (93) to a Fibre Channel Frame (71);
said FCoE Frame (93) including an SOF field (124) for providing an SOF character used to start said Fibre Channel Frame (71); said SOF field (124) for encoding said SOF field Fibre Channel Frame (70);
said FCoE Frame (93) including an EOF field (126) for providing an EOF character used to end said Fibre Channel Frame (71); said EOF field (126) for encoding said EOF field Fibre Channel Frame (80); and
said FCoE Transformer (46) sending said Fibre Channel Frame (71) to said Fibre Channel Device (23).

6. A method comprising the steps of:
providing a Server (32) including an FCoE HBA (40);
said FCoE HBA (40) an Ethernet Interface (44);
providing a Layer 2 Ethernet Switch (24);
providing an FCoE Transformer (46);
said FCoE Transformer (46) including an Ethernet Interface (44) and a Fibre Channel Interface (48);
providing an FCoE Fabric (50) including a plurality of Ethernet Interfaces (44) and a plurality of Fibre Channel Ports (54);
providing a Fibre Channel Device (23);
said FCoE HBA (40) sending an FCoE Frame (93) to said FCoE Fabric (50) via said Layer 2 Ethernet Switch (24);
said FCoE Frame (93) is conveyed in an Ethernet Frame (83) without utilizing an IP packet and without requiring the use of IP packets to encapsulate the Fibre Channel data;

said FCoE Fabric (50) sending said FCoE Frame (93) to said FCoE Transformer (46) via said Layer 2 Ethernet Switch (24);

said FCoE Frame (93) is sent to said FCoE Transformer (46) based in information fields contained in an FCoE Header (92) and an FCoE Type Header (94), said FCoE Transformer (46) converting said FCoE Frame (93) to a Fibre Channel Frame (71);

said FCoE Frame (93) including an SOF field (124) for providing an SOF character used to start said Fibre Channel Frame (71); said SOF field (124) for encoding said SOF field Fibre Channel Frame (70);

said FCoE Frame (93) including an EOF field (126) for providing an EOF character used to end said Fibre Channel Frame (71); said EOF field (126) for encoding said EOF field Fibre Channel Frame (80); and said FCoE Transformer (46) sending said Fibre Channel Frame (71) to said Fibre Channel Device (23).

7. A method comprising the steps of:

providing a Server (32) including an Fibre Channel HBA (61);

said Fibre Channel HBA (61) including a Fibre Channel Interface (48);

providing an FCoE Transformer (46) connected to said Fibre Channel HBA (61);

providing a Fibre Channel Device (23);

providing an FCoE Transformer (46) connected to said Fibre Channel Device (23);

each of said FCoE Transformers including an Ethernet Interface (44) and an Fibre Channel Interface (48);

providing a Layer 2 Ethernet Switch (24);

providing an FCoE Fabric (50) including Ethernet Interfaces (44) and Well Known Fibre Channel Ports (54);

said Fibre Channel HBA (61) sending a Fibre Channel Frame (71) to said FCoE Transformer (46) connected to said Fibre Channel HBA (61);

said FCoE Transformer (46) converting said Fibre Channel Frame (71) to an FCoE Frame (93);

said FCoE Frame (93) is conveyed in an Ethernet Frame (83) without utilizing an IP packet and without requiring the use of IP packets to encapsulate the Fibre Channel data;

said FCoE Transformer (46) sending said FCoE Frame (93) to said FCoE Fabric (46);

said FCoE Fabric sending said FCoE Frame (93) to said FCoE Transformer (46) connected to said Fibre Channel Device (23);

said FCoE Transformer (46) converting said FCoE Frame (93) to a Fibre Channel Frame (71);

said FCoE Frame (93) including an SOF field (124) for providing an SOF character used to start said Fibre Channel Frame (71); said SOF field (124) for encoding said SOF field Fibre Channel Frame (70);

said FCoE Frame (93) including an EOF field (126) for providing an EOF character used to end said Fibre Channel Frame (71); said EOF field (126) for encoding said EOF field Fibre Channel Frame (80); and said FCoE Transformer (46) sending said Fibre Channel Frame (71) to a Fibre Channel Device (23).

8. A method as recited in claim 7 in which:

said FCoE Frame (93) includes an Interface Port Identifier field (102) and an Interface Identifier field (104).

\* \* \* \* \*